United States Patent
Zhou et al.

(10) Patent No.: US 7,589,720 B2
(45) Date of Patent: Sep. 15, 2009

(54) MESH EDITING WITH GRADIENT FIELD MANIPULATION AND USER INTERACTIVE TOOLS FOR OBJECT MERGING

(75) Inventors: Kun Zhou, Guang Ming Li (CN);
Baining Guo, Hou Sha Yu (CN);
Heung-Yeung Shum, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 685 days.

(21) Appl. No.: 10/911,394

(22) Filed: Aug. 4, 2004

(65) Prior Publication Data

US 2006/0028466 A1    Feb. 9, 2006

(51) Int. Cl.
   *G06T 17/20* (2006.01)
   *G06T 15/00* (2006.01)
   *G06T 17/00* (2006.01)
   *G09G 5/00* (2006.01)

(52) U.S. Cl. .................. 345/423; 345/419; 345/420; 345/629

(58) Field of Classification Search .............. 345/420, 345/423, 426, 589, 629, 630, 419
   See application file for complete search history.

(56) References Cited

U.S. PATENT DOCUMENTS

| | | | | |
|---|---|---|---|---|
| 4,791,581 A | * | 12/1988 | Ohba | 345/585 |
| 4,885,702 A | * | 12/1989 | Ohba | 345/419 |
| 5,175,808 A | * | 12/1992 | Sayre | 345/647 |
| 5,265,197 A | * | 11/1993 | Kondo | 345/420 |
| 5,412,762 A | * | 5/1995 | Kondo | 345/420 |

(Continued)

FOREIGN PATENT DOCUMENTS

EP    1136951 A2 *    9/2001

(Continued)

OTHER PUBLICATIONS

Bendels, G. H. and Klein, R. 2003. "Mesh forging: editing of 3D-meshes using implicitly defined occluders", Proceedings of the 2003 Eurographics/ACM SIGGRAPH Symposium on Geometry Processing, Jun. 23-25, 2003, ACM International Conference Proceeding Series, vol. 43, Eurographics Association, pp. 207-217.*

(Continued)

*Primary Examiner*—Peter-Anthony Pappas
*Assistant Examiner*—Roberta Prendergast
(74) *Attorney, Agent, or Firm*—Steven M. Koehler; Westman, Champlin & Kelly, P.A.

(57) ABSTRACT

User interactive methods of determining vertex correspondence between boundaries or curves on objects to be merged is provided. One method relates to projecting a boundary of one object onto a second object to determine a merging curve, along which the two objects will be joined. Another method includes projecting a first object onto a plane to form a planar curve. The planar curve is then mapped to a second object to form a merging curve. Still another method includes interactively selecting corresponding key vertices on different objects to form a merging curve. A system presented that can use one or more of the methods of determining correspondence between boundaries. A merged object can be generated from the merging curve using a mesh solver, such as a Poisson or non-Poisson mesh solver.

15 Claims, 16 Drawing Sheets

U.S. PATENT DOCUMENTS

| | | | | |
|---|---|---|---|---|
| 5,506,947 | A * | 4/1996 | Taubin | 345/441 |
| 5,557,710 | A * | 9/1996 | Amdursky et al. | 345/419 |
| 5,557,719 | A * | 9/1996 | Ooka et al. | 345/441 |
| 5,581,308 | A * | 12/1996 | Lee | 348/699 |
| 5,615,317 | A * | 3/1997 | Freitag | 345/419 |
| 5,627,949 | A * | 5/1997 | Letcher, Jr. | 345/420 |
| 5,636,338 | A * | 6/1997 | Moreton | 345/442 |
| 5,701,404 | A * | 12/1997 | Stevens et al. | 345/423 |
| 5,754,181 | A * | 5/1998 | Amdursky et al. | 345/419 |
| 5,870,103 | A * | 2/1999 | Luo | 345/630 |
| 5,999,188 | A * | 12/1999 | Kumar et al. | 345/423 |
| 6,014,684 | A * | 1/2000 | Hoffman | 708/620 |
| 6,054,992 | A * | 4/2000 | Gibson | 345/424 |
| 6,106,466 | A * | 8/2000 | Sheehan et al. | 600/443 |
| 6,181,978 | B1 * | 1/2001 | Hinds et al. | 700/182 |
| 6,256,038 | B1 * | 7/2001 | Krishnamurthy | 345/419 |
| 6,256,039 | B1 * | 7/2001 | Krishnamurthy | 345/420 |
| 6,271,856 | B1 * | 8/2001 | Krishnamurthy | 345/581 |
| 6,307,555 | B1 * | 10/2001 | Lee | 345/423 |
| 6,351,269 | B1 * | 2/2002 | Georgiev | 345/629 |
| 6,369,815 | B1 * | 4/2002 | Celniker et al. | 345/420 |
| 6,516,093 | B1 * | 2/2003 | Pardas et al. | 382/243 |
| 6,639,592 | B1 * | 10/2003 | Dayanand et al. | 345/419 |
| 6,795,069 | B2 * | 9/2004 | Raskar et al. | 345/419 |
| 6,806,874 | B2 * | 10/2004 | Biermann et al. | 345/420 |
| 6,873,724 | B2 * | 3/2005 | Brand | 382/154 |
| 6,912,293 | B1 * | 6/2005 | Korobkin | 382/100 |
| 6,987,511 | B2 * | 1/2006 | Taubin | 345/420 |
| 7,076,117 | B2 * | 7/2006 | Biermann et al. | 382/285 |
| 7,123,263 | B2 * | 10/2006 | Harvill | 345/473 |
| 7,148,904 | B2 * | 12/2006 | Horita et al. | 345/629 |
| 7,236,170 | B2 * | 6/2007 | Sepulveda | 345/423 |
| 7,239,321 | B2 * | 7/2007 | Berger | 345/473 |
| 7,274,810 | B2 * | 9/2007 | Reeves et al. | 382/128 |
| 2001/0056308 | A1 * | 12/2001 | Petrov et al. | 700/98 |
| 2002/0191863 | A1 * | 12/2002 | Biermann et al. | 382/285 |
| 2003/0020710 | A1 * | 1/2003 | Biermann et al. | 345/420 |
| 2003/0222868 | A1 * | 12/2003 | Raskar et al. | 345/419 |
| 2004/0075659 | A1 * | 4/2004 | Taubin | 345/428 |
| 2005/0128211 | A1 * | 6/2005 | Berger et al. | 345/582 |

FOREIGN PATENT DOCUMENTS

| | | | |
|---|---|---|---|
| WO | WO 0108102 A1 | * | 2/2001 |

OTHER PUBLICATIONS

Guo, Baining, "Modeling arbitrary smooth objects with algebraic surfaces",Ph.D. Dissertation, Cornell University, 1991, 101 pages.*

Xiaohu Guo; Jing Hua; Hong Qin; "Point set surface editing techniques based on level-sets", Proceedings Computer Graphics International, Jun. 7-9, 2004, pp. 52-59.*

Sorkine, O.; Cohen-Or, D.; "Least-squares meshes", Proceedings Computer Graphics International, Jun. 7-9, 2004, pp. 191-199.*

Furukawa, Y., Masuda, H., Miura, K. T., and Yamato, H., 2003, "Cut-and-paste editing based on constrained b-spline volume fitting", Proceedings of Computer Graphics International 2003, pp. 222-225.*

Kahler, K.; Rossal, C.; Schneider, R.; Vorsatz, J.; Seidel, H.-P., "Efficient processing of large 3D meshes", SMI 2001 International Conference on Shape Modeling and Applications, pp. 228-237, May 2001.*

Zhang, Q., Liu, Z., Guo, B., and Shum, H., "Geometry-driven photorealistic facial expression synthesis", Proceedings of the 2003 ACM Siggraph/Eurographics Symposium on Computer Animation, San Diego, California, Jul. 26-27, 2003, Eurographics Association, Aire-la-Ville, Switzerland, pp. 177-186.*

Pedersen, H. K., "Decorating implicit surfaces" In Proceedings of the 22nd Annual Conference on Computer Graphics and interactive Techniques, SIGGRAPH '95, S. G. Mair and R. Cook, Eds., Sep. 1995, ACM Press, NY, NY, pp. 291-300.*

Allegre, R.; Barbier, A.; Galin, E.; Akkouche, S., "A hybrid shape representation for free-form modeling", Proceedings Shape Modeling Applications 2004, Jun. 7-9, 2004, pp. 7-18.*

Bloomenthal, J. and Ferguson, K., "Polygonization of non-manifold implicit surfaces", In Proceedings of the 22nd Annual Conference on Computer Graphics and interactive Techniques, SIGGRAPH '95, S. G. Mair and R. Cook, Eds., Sep. 1995, ACM Press, NY, NY, pp. 309-316.*

Cinar, A., "Fuzzy blending of materials" Proceedings of the 2nd international Conference on Computer Graphics and interactive Techniques in Australasia and South East Asia, Jun. 15-18, 2004, S. N. Spencer, Ed., Graphite '04, ACM Press, NY, NY, pp. 162-166.*

Du, H., "Interactive shape design using volumetric implicit PDEs" Proceedings of the Eighth ACM Symposium on Solid Modeling and Applications, Jun. 16-20, 2003, SM '03, ACM Press, NY, NY, pp. 235-246.*

Karkanis, T.; Stewart, A.J.; "Curvature-dependent triangulation of implicit surfaces", IEEE Computer Graphics and Applications, vol. 21, Issue 2, Mar.-Apr. 2001, pp. 60-69.*

Middleditch, A. E. and Sears, K. H., "Blend surfaces for set theoretic volume modelling systems", Proceedings of the 12th Annual Conference on Computer Graphics and interactive Techniques, SIGGRAPH '85, Jul. 1985, ACM Press, NY, NY, pp. 161-170.*

Sorkine et al., "Laplacian surface editing", In Proceedings of the 2004 Eurographics/ACM SIGGRAPH Symposium on Geometry Processing, Jul. 8-10, 2004, SGP '04, vol. 71, ACM Press, NY, NY, pp. 175-184.*

Suffern, K.G.; Balsys, R.J.; "Rendering the intersections of implicit surfaces", IEEE Computer Graphics and Applications, vol. 23, Issue 5, Sep.-Oct. 2003, pp. 70-77.*

Turk, G. and O'Brien, J. F., "Shape transformation using variational implicit functions", Proceedings of the 26th Annual Conference on Computer Graphics and interactive Techniques, ACM Press/Addison-Wesley Publishing Co., NY, NY, pp. 335-342, Jul. 1999.*

Vaishnav, H. and Rockwood, A., "Blending parametric objects by implicit techniques", Proceedings on the Second ACM Symposium on Solid Modeling and Applications, May 19-21, 1993, J. Rossignac, J. Turner, and G. Allen, Eds., SMA '93, ACM Press, NY, NY, pp. 165-168.*

Yu, Y., et al., "Mesh editing with poisson-based gradient field manipulation", ACM SIGGRAPH 2004 Papers, Aug. 8-12, 2004, J. Marks, Ed., SIGGRAPH '04, ACM Press, NY, NY, pp. 644-651.*

K. Zhou et al. Mesh editing with gradient field manipulation. Microsoft Technical Report MSR-TR-2004-39, Apr. 2004.

Z. Karni and C. Gotsman. Spectral compression of mesh geometry. In *Proc. SIGGRAPH '00*, pp. 279-287, 2000.

K. Polthier and E. Preuss. Variational approach to vector field decomposition, In *Proc. Eurographics Workshop on Scientific Visualization*, 2000, pp. 1-9.

R. Scopigno, D. Zorin, Iso-charts: Stretch-driven mesh parameterization using spectral analysis. In *Eurographics Symposium on Geometry Processing*, 2004, pp. 1-10.

S. Arya, D. Mount, N. Netanyahu, R. Silverman and A. Wu. An optimal algorithm for approximate nearest neighbor searching in fixed dimensions.*Journal of the ACM*, 45:891-923, 1998.

C. Bajaj and G. Xu. Anistropic diffusion on surfaces and functions on surfaces. *ACM Transactions on Graphics*, 22(1):4-32, 2003.

A. H. Barr. Global and local deformations of solid primitives. *Computer Graphics (SIGGRAPH '84)*, 18(3): 21-30, 1984.

H. Biermann, D. Kristjansson and D. Zorin, Approximate boolean operations on free-form solids. In *Proceedings of SIGGRAPH*, pp. 185-194, 2001.

H. Biermann, I. Martin, F. Bernardini and D. Zorin. Cut-and-paste editing of multiresolution surfaces. *ACM Transactions on Graphics*, 21(3):312-321, 2002.

M. Botsch and L. Kobbelt. Multiresolution surface representation based on displacement volumes. *Computer Graphics Forum*, 22(3):483-491, 2003.

Y.-K, Chang and A. P. Rockwood. A generalized de Casteljau approach to 3D free-form deformation. In *Proceedings of SIGGRAPH '91* , pp. 257-260, 1994.

S. Coquillart. Extended free-form deformation: A sculpturing tool for 3D geometric modeling. *Computer Graphics (SIGGRAPH '90)*, 24(4):187-196, 1990.

M. Desbrun, M. Meyer, P. Schroder and A.H. Barr. Anisotropic feature-preserving denoising of height fields and bivariate data. In *Proceedings on Graphics Interface*, pp. 145-152, 2000.

S. Fleishman, I. Drori and D. Cohen-Or. Bilateral mesh denoising. *ACM Transactions on Graphics*, 22(3):950-953, 2003.

J.E. Gain and N.A. Dodgson. Preventing self-intersection under free-form deformation. *IEEE Transactions on Visualization and Computer Graphics*, 7(4):289-298, 2001.

I. Guskov, W. Sweldens and P. Schroder. Multiresolution signal processing for meshes, In *Proceedings of SIGGRAPH '99*, pp. 325-334, 1999.

W.M.Hsu, J.F. Hughes and H. Kaufman. Direct manipulation of free-form deformations. In *Proceedigns of SIGGRAPH '92*, pp. 177-184, 1992.

T.R. Jones, F. Durand and M. Desbrun. Non-iterative, feature-preserving mesh smoothing. *ACM Transactions on Graphics*, 22(3):943-949, 2003.

A. Khodakovsky and P. Schroder. Fine level feature editing for subdivision surfaces. In *ACM Solid Modeling Symposium*, pp. 203-221,1 1999.

L. Kobbelt, S. Campagna, J. Vorsatz and H.-P. Seidel. Interactive multiresolution modeling on arbitrary meshes. In *Proceedings on SIGGRAPH '98*, pp. 15-114, 1998.

L. Kobbelt, T. Bareuther and H.-P. Seidel. Multiresolution shape deformations for meshes with dynamic vertex connectivity. *Computer Graphics Forum*, 19(3):249-260, 2000.

B. Levy. Dual domain extrapolation. *ACM Transactions on Graphics*, 22(3):364-369, 2003.

Y. Lipman, O. Sorkine, D. Cohen-Or, D. Levin, C. Rossl and H.-P. Seidel. Differential coordinates for interactive mesh editing. In *Proceedings of Shape Modeling International 2004*, pp. 181-190.

I. Llamas, B. Kim, J. Gargus, J. Rossignac and C.D. Shaw. Twister: A space-warp operator for the two-handed editing of 3D shapes. *ACM Transactions on Graphics*, 22(3):663-668, 2003.

R. MacCracken and K.I. Joy. Free-form deformations with lattices of arbitrary topology. In *Proceedings of SIGGRAPH '96*, pp. 181-188. 1996.

M. Meyer, M. Desbrun, P. Schroder and A.H. Barr. Discrete differential geometry operators for triangulated 2-manifolds. In H.-C, Hege and K. Polthier, editors, *Visualization and Mathematics III*, pp. 35-57. Springer-Verlag, Heidelberg, 2003.

T. Milliron, R.J. Jensen, R. Barzel and A. Finkelstein. A framework for geometric warps and deformations. *ACM Transactions on Graphics*, 21(1):20-51, 2002.

K. Museth, D.E. Breen, R.T. Whitaker and A.H. Barr.Level set surface editing operators. *ACM Transactions on Graphics*, 21(3):330-338, 2002.

P. Perez, M. Gangnet and A. Blake. Poisson image editing. *ACM Transactions on Graphics*, 22(3):313-318, 2003.

P. Perona and J. Malik, Scale-space and edge detection using anisotropic diffusion. *IEEE Transactions on Pattern Analysis and Machine Intelligence*, 12(7):629-639, 1990.

R. Abraham, J.E. Marsden and T.Ratiu. Manifolds, Tensor Analysis, and Applications. $2^{nd}$ edition, Springer-Verlag 1988.New York, 643 pages.

F. Lazarus, S. Coquillart and P. Jancene. Axial deformations: and intuitive deformation technique. Computer Aided Design, vol. 26(8), 1994, pp. 607-613.

T.W. Sederberg and S.R. Parry. Free-form deformation of solid geometric models. Computer Graphics (SIGGRAPH 86) vol. 20(4), 1986,pp. 151-160.

K. Singh and E. Fiume. Wires: A Geometric Deformation Technique. In Proc. SIGGRAPH '98, pp. 405-414, 1998.

J. Sethian. Level Set Methods and Fast Marching Methods. Cambridge University Press. 1999.

O. Sorkine, D. Cohen-Or, R. Goldenthal and D. Lischinski. Bounded-distortion piecewise mesh parameterization. IEEE Visualization, 2002, pp. 355-362.

J. Stam. Stable fluids, In SIGGRAPH 99 Conference Proceedings, pp. 121-128, 1999.

T. Tasdizen, R. Whitaker, P. Burchard and S. Osher. Geometric surface smoothing via anisotropic diffusion of normals. In Proceedings IEEE Visualization, pp. 125-132. 2002.

G. Taubin, A signal processing approach to fair surface design. In Proc. SIGGRAPH '95, pp. 351-358, 1995.

G. Taubin. Linear anisotropic mesh filtering. Technical report, IBM Research Report RC2213, 2001.

J.E. Tohline. Origin of the poisson equation. http://222.phys.1su.edu/astro/H_Book.current/Context/PGE/poisson.origin.text.pdf, at least by Aug. 31, 2003.

Y. Tong, S. Lombeyda, A.N. Hirani and M. Desbrun. discrete Multiscale Vector Field Decomposition. ACM Trans. Graphics, vol. 22(3), pp. 445-452, 2003.

H. Yagou, Y. Ohtake and A. Belyaev. Mesh denoising via iterative alpha-trimming and nonlinear diffusion of normals with automatic thresholding. In Proc. Computer Graphics Intl., 2003. pp. 1-6.

\* cited by examiner

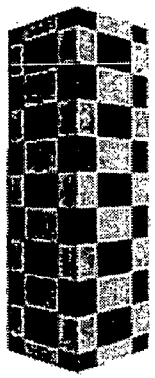
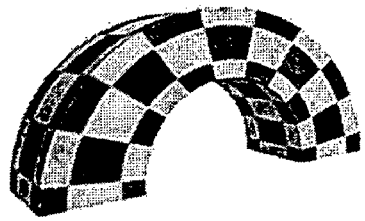
FIG. 8A     FIG. 8B     FIG. 8C
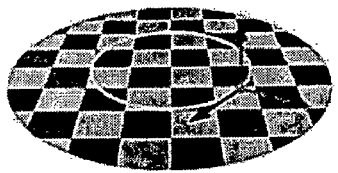
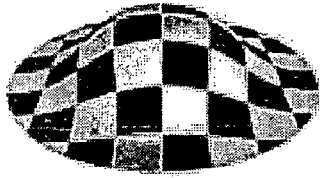
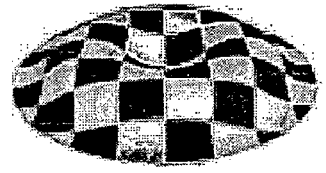
FIG. 9A     FIG. 9B     FIG. 9C
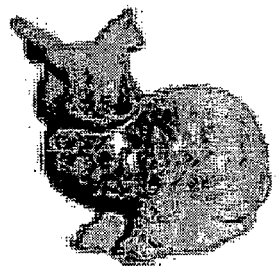
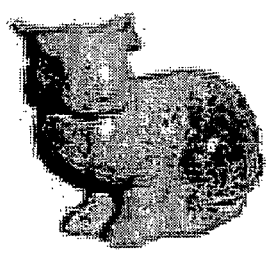
FIG. 10A     FIG. 10B
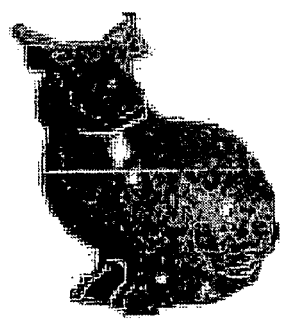
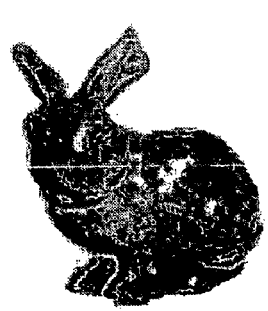
FIG. 10C     FIG. 10D Our algorithm Naïve Poisson

WIRE

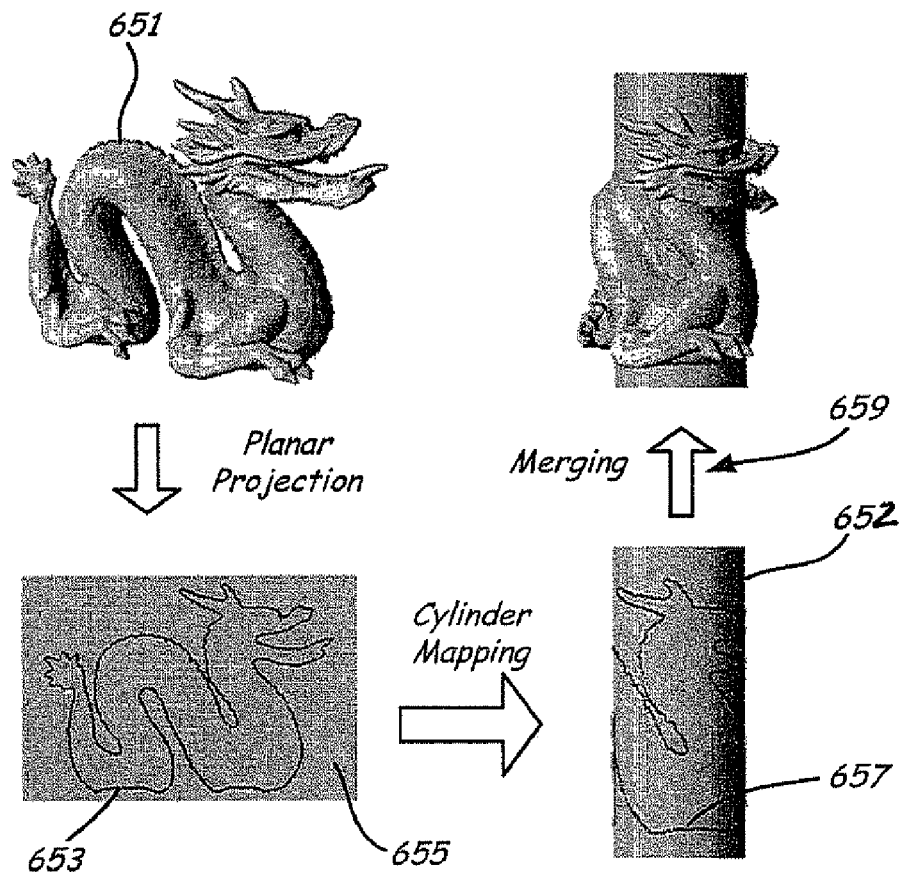
FIG. 14
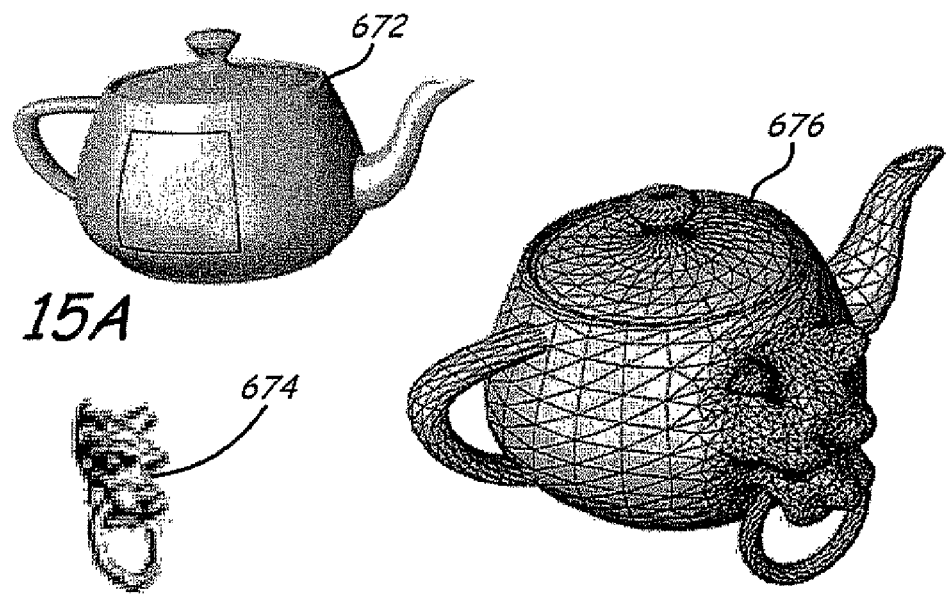
FIG. 15A
FIG. 15B
FIG. 15C

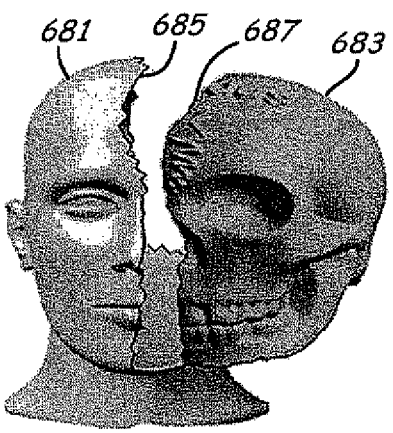
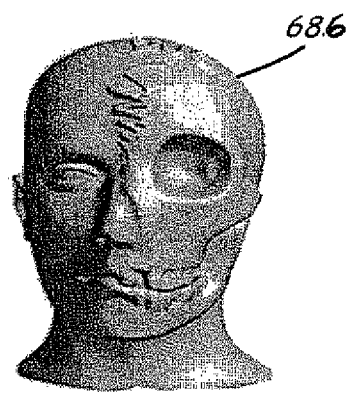
FIG. 16A    FIG. 16B
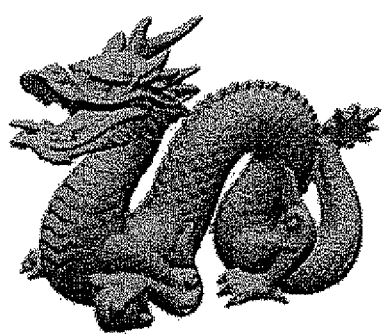
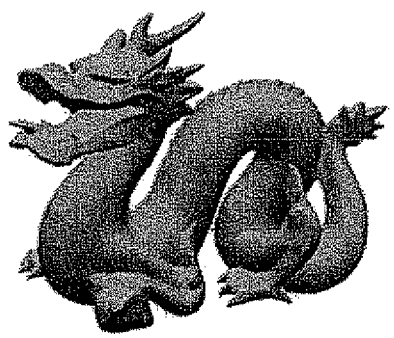
FIG. 17A    FIG. 17B
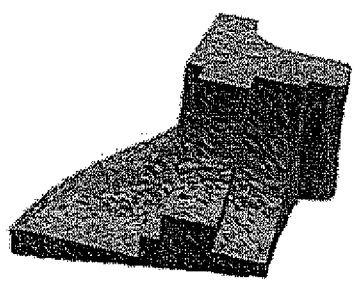
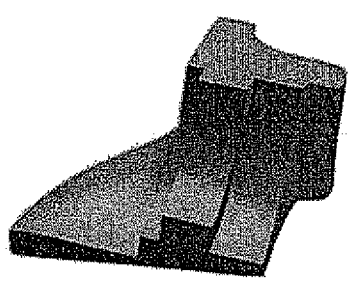
FIG. 18A    FIG. 18B
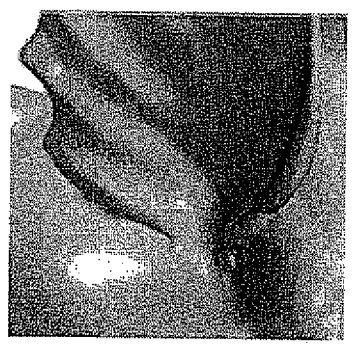
FIG. 19A    FIG. 19B

MESH EDITING WITH GRADIENT FIELD MANIPULATION AND USER INTERACTIVE TOOLS FOR OBJECT MERGING

BACKGROUND OF THE INVENTION

The present invention relates to computer generated graphical images. More particularly, the present invention relates to mesh editing systems.

Computer graphics are used in computer games, engineering and design, television and cinema, and similar applications where a computer-generated image is desired. Computer graphics can generally be two or three dimensional, but three-dimensional computer graphics, by providing height, width, and depth to an object, are especially useful in realistically modeling and rendering an object.

Commonly, computer graphics systems can comprise free form or scanned models that are stored in a computer as a mesh or lattice of interconnected triangles. Each triangle represents a different flat or planar surface on an object. The mesh can be manipulated or edited during editing operations by moving, rotating, and/or stretching the triangles. Examples of such operations include deformation, both large scale and detail editing, object merging, and smoothing.

Surfaces in computer graphics are often represented in global coordinate systems: explicit representations based on points or vertices typically described using absolute Euclidean coordinates. In contrast, implicit representations describe surface shape as the level set of a function defined in Euclidean space. Global coordinate systems can be useful in many operations. For local surface modeling, it is often desirable for the representation to capture the local shape or intrinsic geometry of the surface.

In the prior mesh editing systems, it has been challenging to perform merging operations of objects having dissimilar shapes and sizes. In particular, it is challenging to determine a merging curve based on correspondence of vertices on boundary curves of objects to be merged. Also, it is generally desirable in mesh editing systems for the operations to be user interactive, including object merging operations.

An improved method of editing meshes that addresses one, some or all of the problems associated with current mesh editing systems would have significant utility.

SUMMARY OF THE INVENTION

The present inventions include interactive methods of determining correspondence between boundaries or curves on objects to be merged. One method relates to projecting a boundary of one object onto a second object to determine a merging curve where the two objects will be joined. Another method includes projecting a first object onto a plane to form a planar curve. The planar curve is then mapped to a second object to form a merging curve. Still another method includes interactively selecting corresponding key vertices on different objects to form a merging curve. A system is presented that can use one or more of the methods of determining correspondence between boundaries. A merged object can be generated from the merging curve using a mesh solver such as a Poisson or non-Poisson mesh solver.

BRIEF DESCRIPTION OF THE DRAWINGS

FIGS. 8A-8C illustrate deformation of a prism

FIGS. 9A-9C illustrate deformation of a disk.

FIGS. 10A-10D illustrate interactive mesh deformation in accordance with the present methods.

FIG. 14 illustrate merging of a dragon and cylinder using planar projection and cylinder mapping.

FIGS. 15A-15C illustrate merging two objects by specifying sparse key vertex correspondences between boundaries.

FIGS. 16A-16B illustrate merging objects with jagged edges.

FIGS. 17A-18B illustrate smoothing.

FIGS. 19A-19B illustrate smoothing of merging boundary of wing and horse in FIGS. 13A-13B.

DETAILED DESCRIPTION OF ILLUSTRATIVE EMBODIMENTS

The present invention relates to a mesh and shape editing system that may or may not use the Poisson equation as its theoretical foundation. In one aspect, methods/modules of merging two object meshes are presented that use various steps or means for determining a boundary or merging curve. Another aspect includes a mesh editing system that uses at least one of these method/modules of determining a boundary curve. However, prior to discussing the present invention in greater detail, an illustrative environment in which the present invention can be used will be discussed first.

Figure 1:
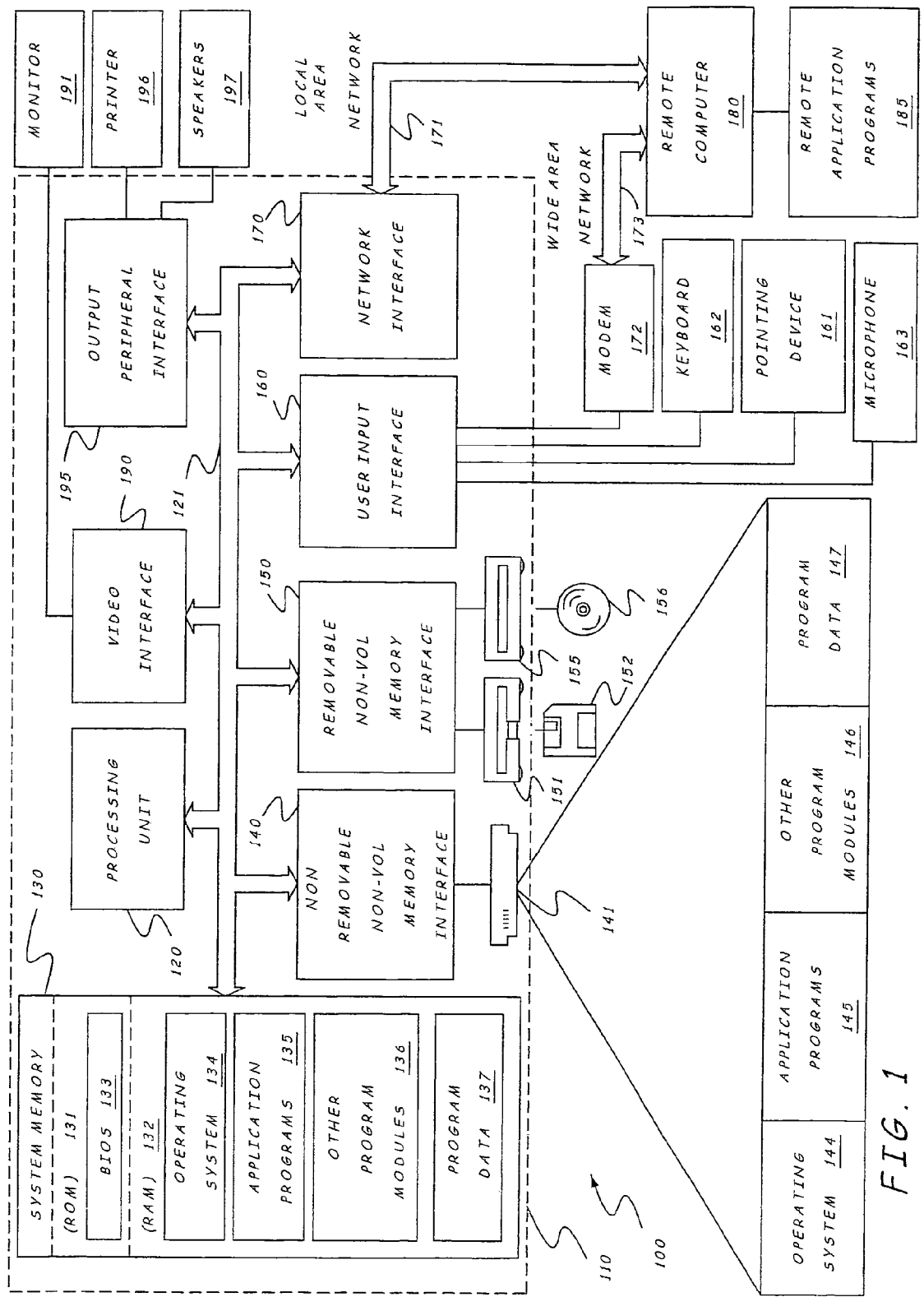
FIG. 1 is a block diagram of a general computing environment in which the present invention may be practiced.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, telephone systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. Those skilled in the art can implement the description and/or figures herein as computer-executable instructions, which can be embodied on any form of computer readable media discussed below.

The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

The Poisson Equation

As stated above, the present mesh system uses the Poisson equation as its theoretical foundation. A brief discussion of the Poisson equation may be useful.

Originally emerging from Isaac Newton's law of gravitation, the Poisson equation with Dirichlet boundary condition is formulated as:

$$\nabla^2 f = \nabla \cdot w, \ f|\partial\Omega = f^*|\partial\Omega \quad \text{Eq. 1}$$

where f is an unknown scalar function; w is a guidance vector field, f* provides the desirable values on the boundary Ω, $$\nabla^2 = \frac{\partial^2}{\partial x^2} + \frac{\partial^2}{\partial y^2} + \frac{\partial^2}{\partial z^2}$$

is the Laplacian operator; and $$\nabla \cdot w = \frac{\partial w_x}{\partial x} + \frac{\partial w_x}{\partial y} + \frac{\partial w_x}{\partial z}$$

is the divergence of $w=(w_x, w_y, w_z)$.

Vector Field Decomposition

The Poisson equation is closely related to Helmholtz-Hodge vector field decomposition. A smooth three dimensional or 3D vector field w defined in a region T can be expressed as follows:

$$w = \nabla\phi + \nabla \times v + h, \quad \text{Eq. 2}$$

where φ is a scalar potential field with $\nabla \times (\nabla\phi)=0$, v is a vector potential field with $\nabla \cdot (\nabla \times \phi)=0$, and h is a field that is both divergence and curl free. The uniqueness of this decomposition requires proper boundary conditions. The scalar potential field φ from this decomposition happens to be the solution of the following least-squares minimization:

$$\min_\phi \int\int_\Omega \|\nabla\phi - w\|^2 dA, \quad \text{Eq. 3}$$

whose solution can also be obtained by solving the Poisson equation, $\nabla^2\phi = \nabla \cdot w$.

Discrete Fields and Divergence

One prerequisite of solving the Poisson equation over a triangle mesh is to overcome its irregular connectivity in comparison to a regular image or voxel grid. One recent approach to circumvent this difficulty is to approximate smooth fields with discrete fields first and then redefine the divergence for the discrete fields. Generally, this "discretization" approach has been taken in "Variational approach to vector field decomposition," in In Proc. Eurographics Workshop on Scientific Visualization, 2000 by K. Polthier and E. Preuss incorporated herein by reference in its entirety.

A discrete vector field on a triangle mesh such as parameterization mesh 200 is defined to be piecewise constant with a constant vector within each triangle 201, 203, 205, etc. A discrete potential field is defined to be a piecewise linear function, $$\phi(x) = \sum_i B_i(x)\phi_i,$$

$B_i$ being the piecewise-linear basis function valued 1 at vertex $v_1$ and 0 at all other vertices, and $\phi_i$ being the value of φ at $v_1$. For a discrete vector field w on a mesh, its divergence at vertex $v_1$ can be defined to be $$(Divw)(v_i) \sum_{T_k \in N(i)} \nabla B_{ik} \cdot w |T_k|, \quad \text{Eq. 4}$$

where N(i) is the set of triangles sharing the vertex $v_1$, $|T_k|$ the area of triangle $T_k$, and $\nabla B_{ik}$ is the gradient vector of $B_i$ within triangle $T_k$. Note that this divergence is dependent on the geometry and 1-ring structures of the underlying mesh.

Poisson Mesh Editing

Given the definitions of discrete fields and their divergence, the discrete Poisson equation can be represented as follows:

$$Div(\nabla\phi) = Divw \quad \text{Eq. 5}$$

However, Equation 5 can be considered a sparse linear system represented as:

$$Af = b \quad \text{Eq. 6}$$

that can be solved using methods, such as the well-known conjugate gradient method. However, other known methods for solving sparse linear equations can be used. For convenience, Equation 5 is referred to as the discrete Poisson equation. It is important to note that the unknown in the discrete Poisson equation is still a scalar potential field. Surface properties or features on a mesh, such as texture, can be defined with Equation 5. As discussed below, the Poisson equation can be used to solve or modify mesh geometry.

A Basic Poisson Mesh Solver

To apply the discrete Poisson equation to mesh editing or processing, it is necessary to consider the three coordinates of a target mesh as three scalar fields defined on a parameterization mesh. The concept of a parameterization mesh has been previously discussed in "Spectral compression of mesh geometry," by Karni, Z. and Gottsman, C., In Proc. SIGGRAPH'00, pp. 279-287, 2000. Since triangle meshes are piecewise linear models, such scalar fields are actually piecewise linear, and satisfy the definition of discrete potential fields. The target and parameterization meshes should have the same topology (vertex connectivity), and their vertices should have one-to-one correspondence.

The purpose of applying the discrete Poisson equation is to solve an unknown target mesh with known topology but unknown geometry (vertex coordinates). To generate or obtain the unknown vertex coordinates, the Poisson equation requires a discrete guidance vector field for each of the three coordinates. Once a discrete guidance vector field w is introduced over the parameterization mesh, its divergence, Divw. (defined in Eq. 4) at a vertex of the parameterization mesh can be computed. The vector b in Equation 6 is obtained from the collection of divergence values at all vertices. The coefficient matrix A in Equation 6 is independent of the guidance field, and can be obtained using the parameterization mesh only. The resulting sparse linear system Af=b is solved to obtain one specific coordinate for all vertices simultaneously. This process is repeated three times to obtain the 3D coordinates of all vertices. In 2D mesh processing, the process can be repeated twice to obtain the coordinates of vertices on a plane. This whole process looks like "mesh cloning," and the guidance fields encode the desired properties of the target mesh. After solution, it is noted that the gradient and guidance fields are the same.

In principle, different parameterization meshes give rise to different target meshes. Due to the nature of the least-squares minimization in Equation 3, the general rule is that guidance vectors associated with larger triangles in the parameterization mesh are better approximated than those associated with smaller triangles. The areas of the triangles serve as the weighting scheme. During mesh editing, the original mesh is given and the goal is to obtain an edited mesh. Therefore, it is most convenient to treat the original mesh as the parameterization mesh and the edited one as the target mesh without any 2D parameterizations.

Gradient Field Editing Using Local Transforms

Figure 2A:
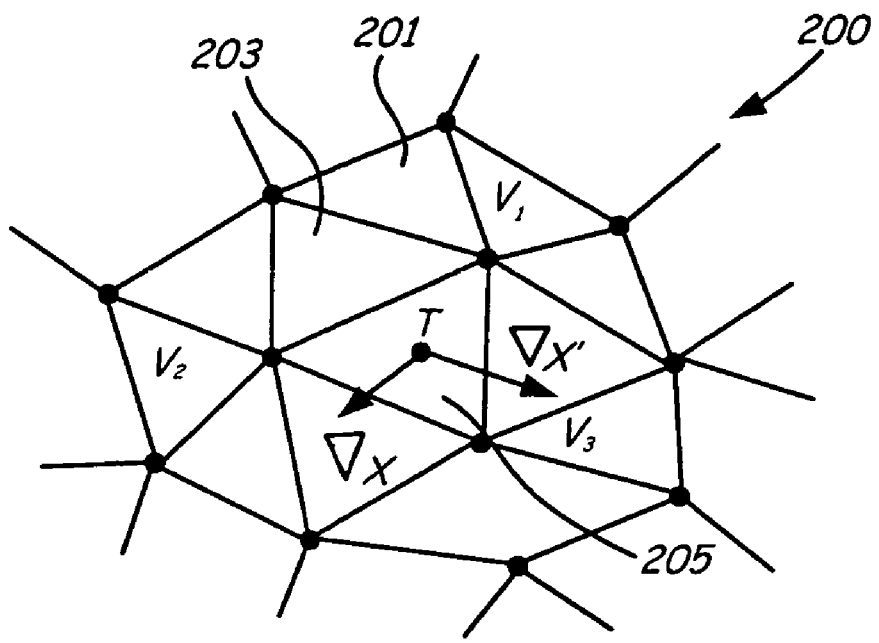
FIG. 2A is a partial view of a parameterization mesh.
Figure 2B:
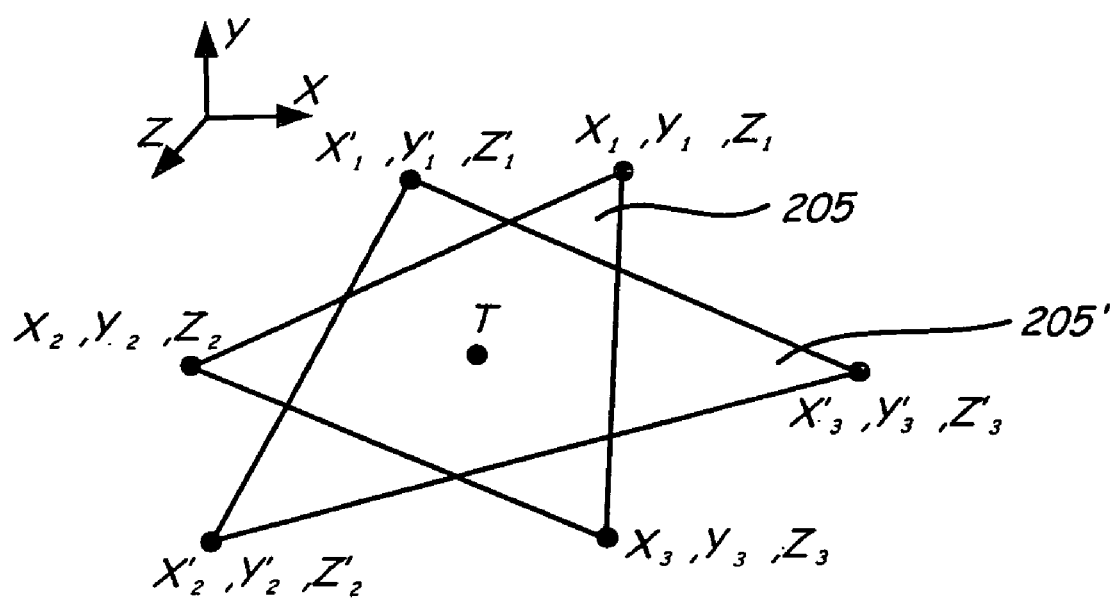
FIG. 2B is illustrates a triangle on the parameterization mesh in FIG. 2A and a transformed triangle.

In some embodiments, meshes can be edited by manipulating their original gradient fields. The Poisson equation relies on both guidance vector fields and boundary conditions. It has been observed that if the boundary conditions are edited while keeping the original gradient fields of a mesh as the guidance fields, most of the resulting mesh will not reflect the changes in the boundary conditions, thereby causing undesirable artifacts as illustrated in FIG. 11B (which was obtained using a Naive Poisson mesh editing method). Therefore, it can be helpful to modify the original gradient fields Gradient editing is achieved by applying local transformations to the triangles and obtaining new gradient vectors of the altered triangles. Note a triangle has three gradient vectors for three coordinates. A local transformation is defined on a per triangle basis. The three vertex positions of a triangle are altered by the same transformation. FIG. 2A illustrates a partial view of a parameterization mesh 200 having triangles 201, 203, 205, etc. FIG. 2B illustrates an original triangle 205 and its transformed version 205'. Each of its coordinates is a scalar function on $\Delta V_1 V_2 V_3$ in FIG. 2A. In addition, vertex, $(X_i, Y_i, Z_i)$ corresponds to $V_i$, where $\Delta x$ and $\Delta x'$ of triangle 205 illustrated in FIG. 2A are the gradient vectors of the x-component of original and transformed triangles, respectively. They are coplanar with $\Delta V_1 V_2 V_3$.

Since gradient vectors are translation invariant, the local transformation is typically carried out in a canonical local frame at the center of the triangle. Examples of transformations include rotation and/or scaling. The new gradient vectors define three new vector fields over the parameterization mesh. Since the local transform applied to each triangle may be different, the original mesh is torn apart and some of the triangles are not connected anymore. FIG. 5C illustrates a mesh of a bunny having triangles locally transformed by the transformation it receives from the propagation. As illustrated, at least some of the triangles or mesh become disconnected.

Therefore, the new vector fields are not likely to be gradient fields of any scalar functions. To reconstruct a mesh from these vector fields, it is necessary to consider them as the guidance fields in the Poisson equation. Given a parameterization mesh and three guidance vector fields, the steps described above can be followed to reconstruct the new target mesh. Intuitively, solving the Poisson equation is analogous to stitching together the previously disconnected triangles again.

Manipulating mesh gradient field is an important component of a Poisson mesh editing system. It is noted that it would be tedious to interactively define a local transform for every triangle of a mesh. Therefore, automatic schemes to obtain such local transforms can be used where gradient manipulation is needed.

The new mesh geometry obtained using the Poisson mesh solver satisfies the orientations and scales imposed by the modified generalized boundary conditions.

Boundary Condition Editing

Global and local mesh editing can be achieved from manipulating a small number of local features such as curves or vertices of the mesh. Satisfying such editing requests is an important part of the present system. Details of user interaction will be discussed in greater detail below. In terms of the Poisson equation, both a curve or a vertex anywhere on a mesh is a boundary condition in the sense that a unique solution to the Poisson equation exists because the Poisson equation is translation invariant. However, meshes are more complicated than simply scalar functions. Geometrically, a set of neighboring vertices on a mesh provides information about vertex position. However, the neighboring vertices also provide information such as normal orientation, curvature, and scale. Therefore, there is a need to generalize the concept of a boundary condition for a mesh.

A generalized boundary condition of a mesh can be defined as a combination of five components BC=(I, P, F, S, R) where I is the index set of a set of connected vertices on the mesh, P is the set of 3D vertex positions, F is a set of local frames which define the local orientations of the vertices, S is the set of scaling factors associated with the vertices, and R is a strength field. It is noted that a vertex is constrained if it belongs to at least one boundary condition. Otherwise, the vertex is a fixed vertex. It is known that a local frame at a vertex is defined by three orthogonal unit vectors, one of the unit vectors being the unit normal. Therefore, the local frame of a vertex on a curve is defined by the normal, tangent, and binormal of the curve. The scaling factor at a vertex can be initialized and only reflects the scale changes before and after an editing operation. The strength field defines the influence of the boundary condition at every free vertex. The influence or strength at a particular free vertex is a function of the minimal distance between the free vertex and the constrained vertices in the boundary condition. The influence regions can vary as necessary, for instance, in one embodiment, the influence region be a function of or based on an average edge length between vertices in the mesh. The influence region can be defined by all the free vertices receiving a nonzero strength. Finally, the influence region can be user selected, such as a user specified parameter.

Once a boundary condition $BC=(I, P, F, S, R)$ needs editing, modified boundary conditions $BC'$ are generated, where $BC'$ is defined as $BC'=(I, P', F', S', R)$. A constrained vertex position $v \in P$ can have a different position, local frame and scale in $BC'$ compared with $BC$. The difference between the modified and original local frames at $v_i$ can be uniquely determined by a single rotation, which is usually represented as a unit quaternion. The difference in scale is represented as a ratio. Thus, each constrained vertex in boundary condition $BC$ has an associated quaternion and ratio to represent local frame and scale changes.

Local frame and scale changes are propagated from the constrained vertices to all the free vertices in the influence region to create a smooth transition. When there is only single boundary condition, $BC_0=(I_0, P_0, F_0, S_0, R)$ and its edited or modified version $BC_0'=(I_0', P_0', F_0', S_0', R_0')$, then the mesh editing system first computes the geodesic distance from each free vertex, denoted by $v_f$, in the original parameterization mesh 200, 304 to the set of constrained vertices in $BC_0$: $D(v_f, P_0) = \min_{v_c \in P_0} \text{dist}(v_f, v_c)$. It is noted that this equation represents a distance transform that can be computed by a level set method such as described in *Level Set Methods and Fast Marching Methods*, by J. Sethian, Cambridge University Press, 1990 herein incorporated by reference in its entirety.

Suppose $v_{min}$ is the constrained vertex in $BC_0$ that is closest to $v_f$. That is, $v_{min} = \arg\min_{v_c \in P_0} \text{dist}(v_f, v_c)$. The simplest scheme known as the "Nearest" scheme directly assigns the quaternion and scale ratio at $V_{min}$ to $v_f$. However, smoother results can be obtained by assigning to $v_f$ the weighted average of the quaternions and scale ratios at all constrained vertices in $BC_0$. The value $\text{dist}(v_f, v_{min})$ can be used as a reference value for the weighting scheme. The weight for a constrained vertex $v_c$ can be determined by the difference between $\text{dist}(v_f, v_c)$ and $\text{dist}(v_f, v_{min})$. The weight drops to zero when the difference becomes sufficiently large. Three weighting schemes were designed: Uniform, Linear, and Gaussian.

In the Uniform scheme, the transforms from all constrained vertices in $BC_0$ are weighted equally. In the Linear scheme, the transform from a constrained vertex, $v_c$, in $BC_0$ is weighted by the inverse of $\text{dist}(v_f, v_c)$. In the Gaussian scheme, the transform from the constrained vertex, $v_c$ in $BC_0$ is weighted by the Gaussian function $$\exp\left(-\frac{(\text{dist}(v_f, v_c) - \text{dist}(v_f, v_{min}))^2}{2\sigma_d^2}\right),$$

where $\sigma_d$ is a user-specified parameter that indicates the width of the Gaussian. In experiments, linear and Gaussian weighting schemes typically produced better results.

However, when there are multiple boundary conditions, $BC_i$, $i=1, \ldots, m$, a free vertex $v_f$ receives a quaternion $q_i$ from each of the boundary conditions. A weight $w_i$ for each quaternion $q_i$ is defined using the strength of the boundary conditions $BC_i$ at the free vertex $v_f$. The strength of the boundary condition in its influence regions can be constant, linearly decreasing or a cosine wave function. The final quaternion assigned to $v_f$ is a weighted average, $$\frac{\sum_i w_i q_i}{\sum_i w_i}.$$

It is noted that weighted averages of quaternions are used. Since quaternions are not communicative, such a weighted average can be implemented by a sequence of spherical-linear interpolations in a fixed order. For example, $$\frac{w_1 q_1 + w_2 q_2 + w_3 q_3}{w_1 + w_2 + w_3}$$

is actually interpreted as $$\frac{w_1 q_1 + w_2 q_2 + w_3 q_3}{w_1 + w_2 + w_3}\left(\frac{w_1}{w_1 + w_2}q_1 + \frac{w_2}{w_1 + w_2}q_2\right) + \frac{w_3}{w_1 + w_2}q_3.$$

The final scale ratio can be defined similarly using the geometric mean.

A local transform for each triangle in the mesh is defined. An average quaternion based on the three quaternions at the three vertices represents the rotation component. The scale ratio represents the scaling factor. Both rotation and scaling can be integrated into a single linear transform applied to the triangle to obtain new guidance vectors. The new mesh geometry can be obtained using a mesh solver such as the Poisson mesh solver described above.

Figure 3:
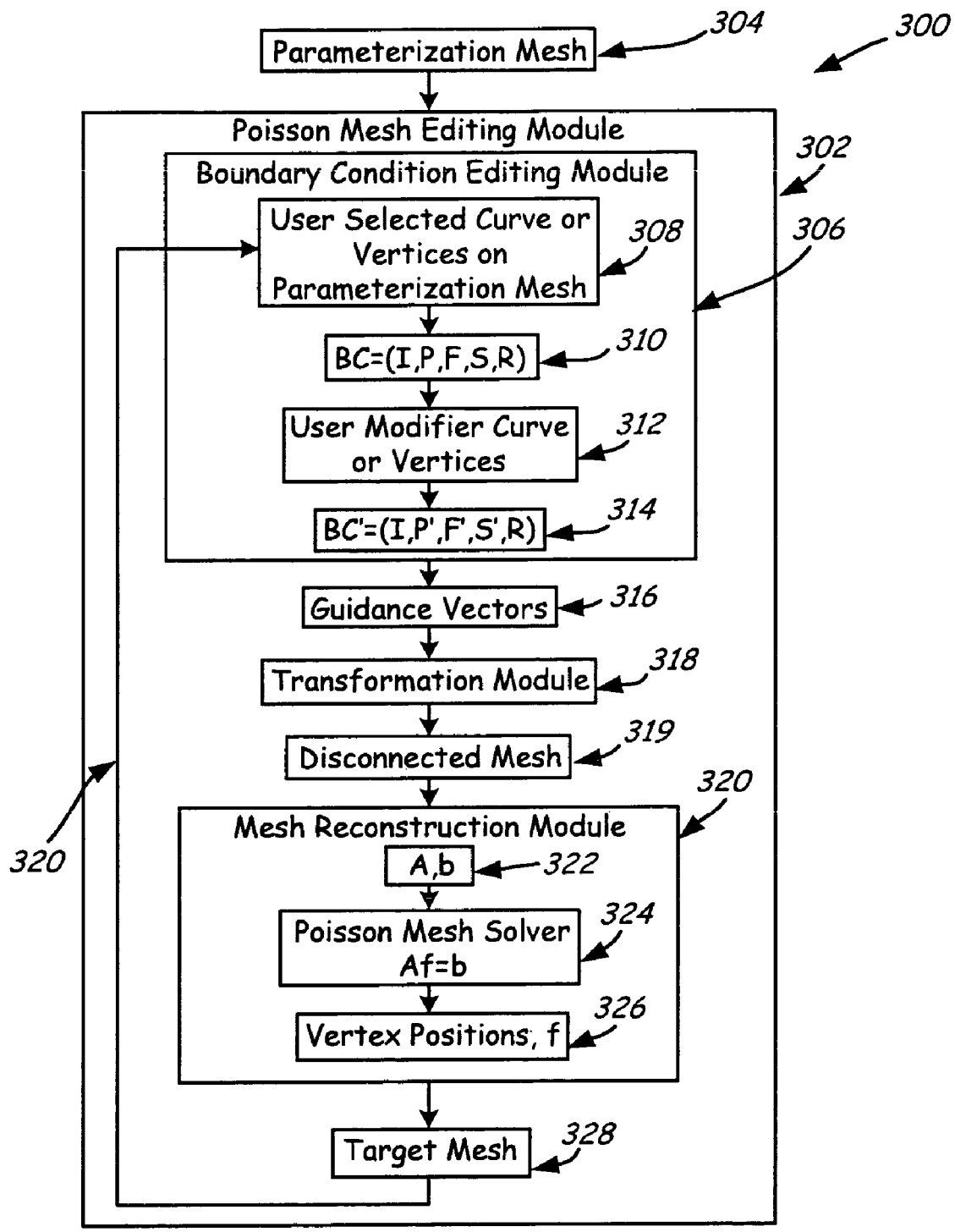
FIG. 3 is a block diagram of a mesh editing system based on the Poisson equation.
Figure 4:
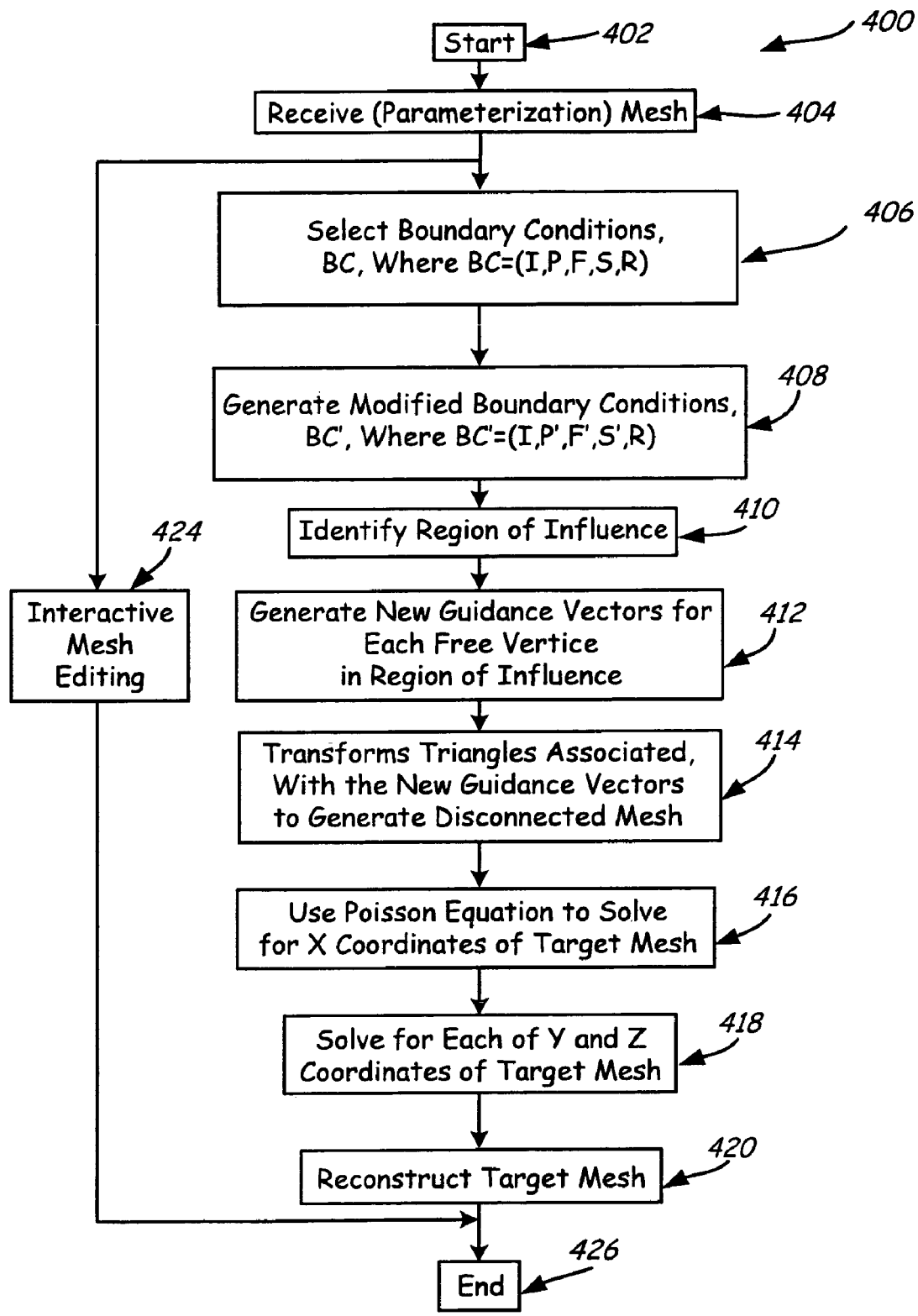
FIG. 4 illustrates steps of a method of using a Poisson mesh solver.

FIG. 3 is a block diagram of a mesh editing system 300 that uses a Poisson mesh solver. However, in some embodiments other non-Poisson mesh solvers can be used. FIG. 4 illustrates steps of method 400 for using a mesh solver, such as the Poisson mesh solver in FIG. 3. At step 402, mesh editing system 300 is initialized. Mesh editing system 300 comprises Poisson mesh editing module 302. At step 404, Poisson mesh editing module 302 receives parameterization mesh 304, which can be created free-form using an existing computer graphics software system or received from any of the input devices described above, such as a scanner. It is noted that parameterization meshes have been used in applications, such as data compression, which depend on topology, such as described in "A signal processing approach to fair surface design," by G. Taubin, In Proc. SIGGRAPH'95, pp. 351-358, 1995 and in "Spectral compression of mesh geometry," by Z. Karni and C. Gotsman, In Proc. SIGGRAPH'00, pp. 279-287, 2000. However, parameterization mesh 304 depends on both geometry and topology.

Parameterization mesh 304 includes a plurality of interconnected vertices that define a triangle mesh. The total number of triangles is specific to a model or mesh, but often do not exceed 10,000 triangles for computer graphics systems operated on ordinary desktop computers. The relationship between the three vertices of each triangle is defined by three scalar or coordinate functions x, y, and z. In general, as described in further detail below, the gradient field of these three scalar functions is then modified. The Poisson equation is then used to solve for the positions of the vertices of a target mesh.

Poisson mesh editing module 302 can be used for editing operations such as large deformation, detail editing, merging, or smoothing. However, it is important to note that the present invention can be used for other mesh editing operations and/or applications.

Poisson mesh editing module 302 comprises boundary condition editing module 306, which generates new guidance vectors 316 based on modified boundary conditions. At step 406, boundary condition editing module 306 receives or identifies a user selected curve of one or more vertices 308. Typically, a user begins editing by selecting a curve or vertices on parameterization mesh 304. Ideally, mesh editing such as by object deformation is user interactive. Selectable curves include open or closed curves or individual single vertices that are defined as boundary conditions BC as indicated at 310.

At step 408, user modified curve or vertices 312 is received or obtained by boundary condition editing module 306 and expressed as modified boundary conditions BC' as indicated at 314 and described above. At Step 410, a region of influence is identified where frame and scale changes will be propagated. At step 412, guidance vectors 316 are generated from the frame and scale changes between BC and BC' in the region of influence.

At step 414, transformation module 318 uses local frame and scale changes, and propagates these local frame and scale changes from the constrained vertices to all the free vertices in the influence region to create a smooth transition. Propagating the local transforms to the triangles in the mesh generates guidance vectors or a guidance field. At this point the mesh becomes disconnected at least in part with some vertices having multiple positions as indicated at 319.

At step 416 and step 418, mesh reconstruction module 320 receives values for A and b (Eq. 6) as indicatated at 322 and solves for the position functions or coordinates f indicated at 326 for each vertex using Poisson mesh solver 324 or other mesh solver. Poisson mesh solver 324 solves the linear system Af=b (Eq. 6) as discussed above.

At step 420, target mesh 328 is generated and rendered to the user. As indicated by reference 320, the editing process is ideally user interactive asindicatated at loop 424. Thus, a user can continuously perform editing operations during an editing session that ends at step 426.

Self-Intersection Prevention

A common problem with mesh editing is the occurrence of self-intersections, which often accompany large-scale deformations. As with other mesh editing systems, self-intersections can occur with Poisson mesh editing. Lessening the possibility of self-intersections can be helpful. The Poisson equation can be enhanced or modified so that important In short, Euclidean adjacency information is explicitly represented in the generalized equation. The generalized equation can then be used to effectively prevent self-intersections. Important Euclidean adjacency information of a mesh T includes a set of vertex pairs expressed as:

$$EA(T) = \{(v_i, v_{i_j}) | n_i \cdot n_{i_j} < 0, i=1, \ldots, N, j=1, \ldots, K_i, K_i \leq K\},$$

where $n_i$ is the normal at $v_i$, N is the number of vertices in T, and K is a prescribed constant. Typically, K=1 already gives good results. $\{v_{i_j}\}_{j=1}^{K_i}$ represents the $K_i$ nearest vertices of vertex $v_i$ that satisfy $n_i \cdot n_{i_j} < 0$, which can be obtained or generated through approximate nearest neighbor (ANN) search as described in "An optimal algorithm for approximate nearest neighbor searching," by S. Arya, D. Mound, N. Netanyahu, R. Silverman, and A. Wu, Journal of the ACM, 45: 891-923, 1998, which is herein incorporated by reference in its entirety.

As indicated above, the Poisson equation can be derived from a minimization problem. To incorporate the Euclidean adjacency information, the following revised minimization formation can be used:

$$\min_u \left[ \int_T \|\nabla u - w_u\|^2 dA + \lambda \sum_i \sum_j (u_i - u_{i_j} - d_{ij}^u)^2 \right], \quad \text{Eq. 7}$$

where u represents one of the three coordinates to solved, $\lambda$ is a constant coefficient, $u_i$ is the corresponding coordinate of $v_i$, and $d_{ij}^u$ is the corresponding coordinate of $d_{ij} = v_i^o - v_{i_j}^o$, where $v_i^o$ represents the original position of $v_i$.

Three parallel minimizations are solved in this manner to obtain or generate a new mesh. The second term in equation 7 tries to maintain the original relative positions of those nearest vertex pairs to avoid or reduce self-intersections. An extended linear system can still be derived from equation 7 by taking partial derivatives since the new term is also quadratic. The $i^{th}$ equation in the linear system is formulated as follows:

$$(Div \nabla u)(v_i) + \sum_j (u_i - u_{i_j}) - \sum_k \sum_j (u_k - u_{k_j}) \delta(k_j, i) = \quad \text{Eq. 8}$$

$$(Div\, w_u)(v_i) + \sum_j d_{kj}^u \delta(k_j, i) - \sum_k \sum_j d_{kj}^u \delta(k_j, i)$$

where the Kronecker function $\delta(k_j, i) = 1$ only when $k_j = i$. The above linear system is called a generalized Poisson equation.

Figure 6A:
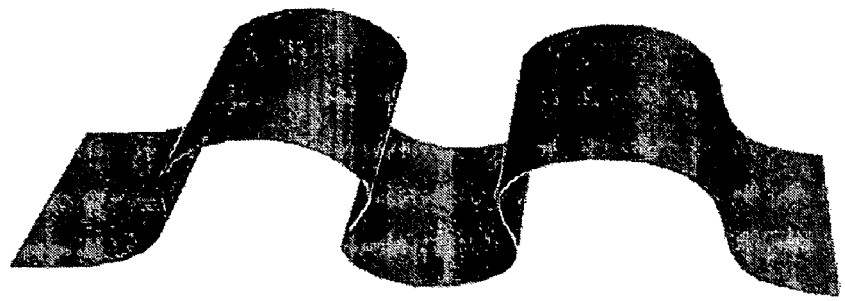
FIGS. 6A-7C illustrate deformation with and without self-intersections.
Figure 6B:
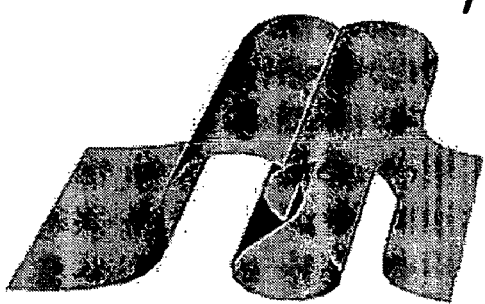
Figure 6C:
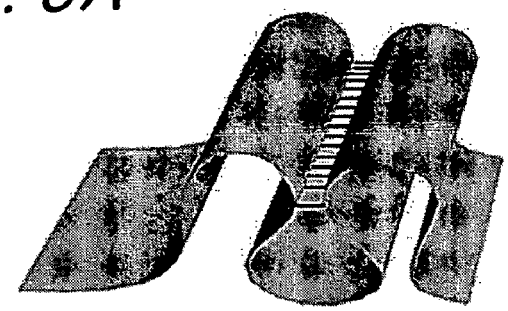
Figure 7A:
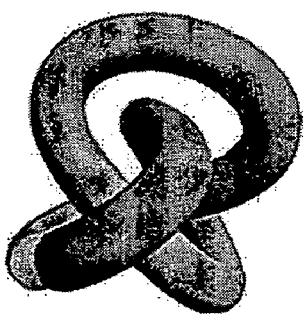
Figure 7B:
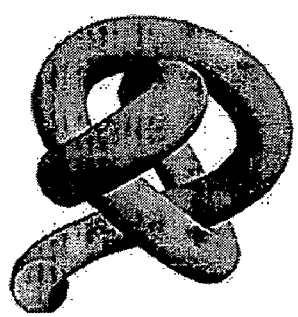
Figure 7C:
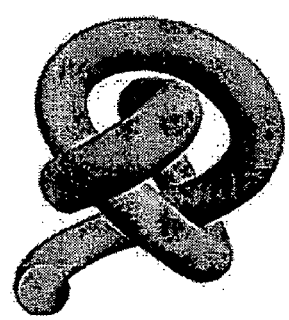

A sufficiently large A can prevent self-intersections from occurring at the expense of fixing the relative positions of the nearest vertex pairs. To allow a certain degree of deformation while avoiding self-intersections, one embodiment starts from zero and iteratively searches for the minimal value of $\lambda$ that can remove all the self-intersections. During each iteration, $\lambda$ is increased incrementally and a mesh corresponding to the new $\lambda$ is solved and subject to self-intersection detection, which can be accelerated with a volume grid. Two image examples modified using the present method and/or modules to prevent self-intersections are illustrated in FIGS. 6A-6C and FIGS. 7A-7C. FIGS. 6A and 7A illustrate a mesh before deformation. FIGS. 6B and 7B illustrate the meshes of FIGS. 6A and 7A, respectively, with self intersections after deformation. FIG. 6C illustrates a deformation result using the present method with $\lambda = 0.6$. Some vertex pairs are shown by line segments. FIG. 7C illustrates a deformation result using the present method where $\lambda = 0.8$.

APPLICATIONS AND EXPERIMENTS

The present mesh editing system has been successfully applied to deformation, object merging, and smoothing, especially anisotropic smoothing. Mesh editing operations are integrated into a mesh editing system with interactive tools for determining correspondence between boundaries on objects to be merged. Several desirable features of the present system include both large-scale deformation and detail editing, which can be performed by a user locally manipulating a curve or vertex on the mesh. Merging of meshes having drastically different open boundaries has been performed. The shapes of the merged meshes can be globally adjusted to be made more compatible with each other.

Mesh Deformation

Boundary conditions are a powerful means to influence the shape of an object. Therefore, one aspect of the present methods includes a method to perform mesh deformation through interactive boundary condition editing. In one embodiment, for convenient user control, only open or closed curves or single vertices are used as boundary conditions. However, other sets of vertices can be used, if desired. For example, vertices of a set can be obtained by interpolation from user selected vertices. Boundary conditions can be fixed boundary conditions or editable boundary conditions during any editing operation or successive editing operations in an editing session. Fixed boundary conditions include vertices on the mesh that the user wishes to hold still during editing. Editable boundary conditions include vertices that have been defined explicitly or implicitly by the user for modification through direct manipulation. The rest of the vertices are free vertices whose positions, local frames, and scale are indirectly controlled by both fixed and editable boundary conditions.

In most embodiments, vertices on the same editable curve can be manipulated or modified either individually or simultaneously. Individual vertex editing can be particularly useful for detail editing of the mesh. Simultaneously editing is a powerful operation that can introduce large scale deformations with minimal user interaction.

The present system can generally support two types of simultaneous editing operations. The first type is simultaneous translation, rotation and/or scaling, which applies the same transformation to all the vertices on the same curve. Translation only changes vertex positions, while rotation and scaling also change local frames and scaling factors. FIGS. 8A-8C illustrate the first type where a prism is deformed by simultaneous editing applied to the rectangular boundary on the top. FIG. 8A is the original model (2040 vertices and 4000 faces). FIG. 8B illustrates the model in FIG. 8A twisted by rotating the top rectangular boundary around the vertical axis of the prism (note the running time to perform this action is approximately equal to 578 ms operating on a desktop computer). FIG. 8C illustrates bending the model in FIG. 8A by rotating the top boundary around a horizontal axis in addition to a translation (running time=609 ms).

The second type is simultaneous rotation of all the vertex normals around their respective tangent directions by the same degree. Since the tangent directions at the vertices differ, the resulting quaternions also differ. FIGS. 9A-9C illustrate a circular disk being deformed by simultaneous normal rotation around a curve with different strength fields. FIG. 9A illustrates an original disk model (1281 vertices, 2480 faces). FIGS. 9B-9C illustrate simultaneous normal rotation around their respective tangents using cosine functions with two different phase angles as their strength fields. The running time for FIGS. 9B-9C is 230 ms. and 240 ms., respectively.

It is important to note that although simultaneous translation does not change local frames, individually translating vertices on a curve does induce changes to orientation. To uniquely determine the quaternions, the algorithm described in Wires: A geometric deformation technique, K. Singh and E. Fiume, In Proc. SIGGRAPH 99 Conference Proceedings, pp. 121-128, 1999 can be used to obtain an intermediate deformed mesh which satisfies the individual vertex displacements only. The local frames from this intermediate mesh are compared to the original local frames to obtain the quaternions, which are propagated before obtaining the final deformed mesh, which can be obtained using Equation 6.

Figure 5A:
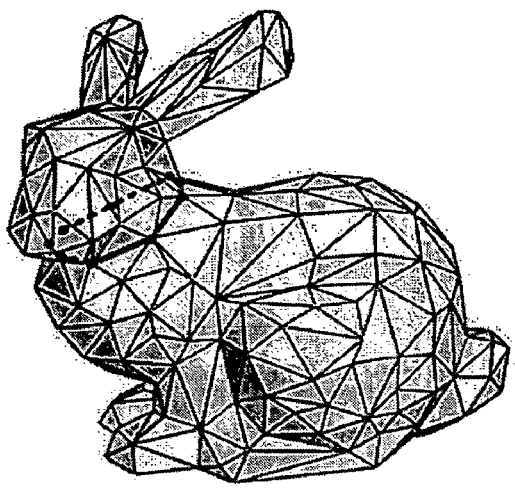
FIGS. 5A-5D illustrate a bunny mesh at different steps in an editing operation in accordance with a Poisson mesh solver.
Figure 5B:
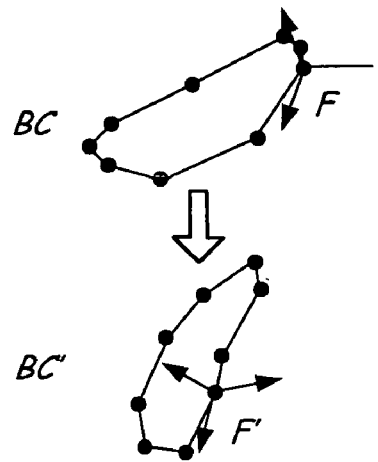
Figure 5C:
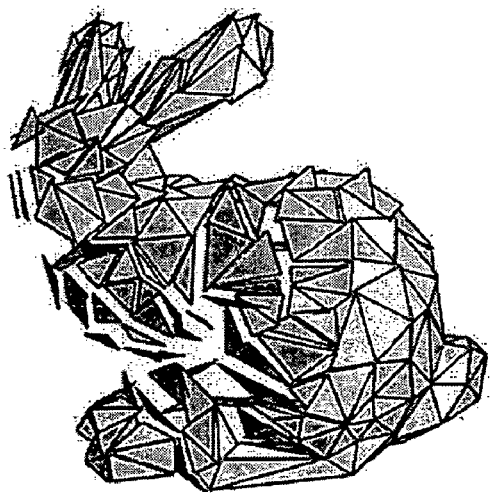
Figure 5D:
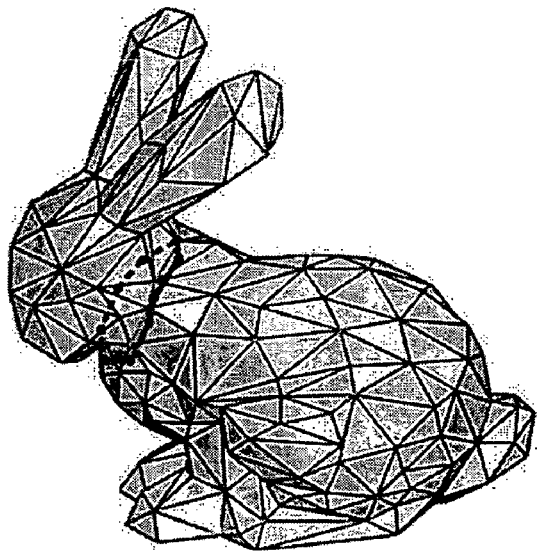

FIGS. 10A-10D illustrate deformation results on the bunny model in FIG. 5A by applying the above two types of simultaneous editing operations to a curve around the neck. Even with large-scale deformations, the bunny's head and body exhibit nice elastic appearances, and at the same time, preserve small-scale features.

Figure 11A:
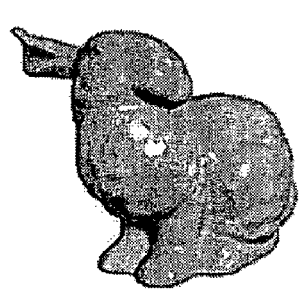
FIGS. 11A-11C illustrate deformation of bunny mesh using various methods.
Figure 11B:
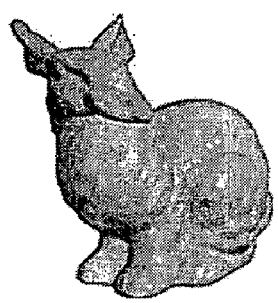
Figure 11C:
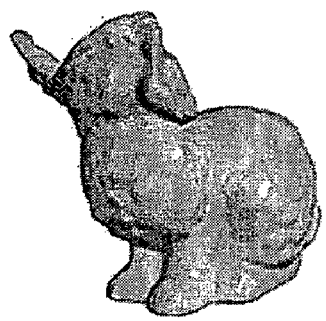

FIG. 11A-11C illustrate a comparison of deformation of the bunny using three different editing methods. FIG. 11A illustrates the bunny edited using the present method or algorithm. FIG. 11B is from naive Poisson editing of vertices, which does not propagate local frame and scale changes. The bunny in FIG. 11B has severe unnatural distortions. The distortions occur at least because, by default, the Poisson equation enforces modified vertex positions in the boundary condition but suppresses orientation and scale changes at the free vertices. As a result, such changes or propagation would be confined to a narrow region adjacent to the constrained vertices, causing unnatural distortions and discontinuities.

FIG. 11C is from WIRE as described in "Wires: A geometric deformation technique," by K. Singh and E. Fiume, In Proc. SIGGRAPH'98, pp. 405-414. However, the original shape of the bunny's head is still not well preserved especially under rotations. This is because WIRE only considers changes in curve tangents, which cannot uniquely determine 3D rotations alone. Ambiguities in curve rotations lead to discontinuous behaviors on the rest of the mesh. Such artifacts can potentially be repaired by using more curves distributed over the mesh. On the other hand, the present method or algorithm can uniquely determine rotations using local frames with three axes, one of which is the surface normal on the curve, Therefore, in the present method curves have more editing power.

Figure 12A:
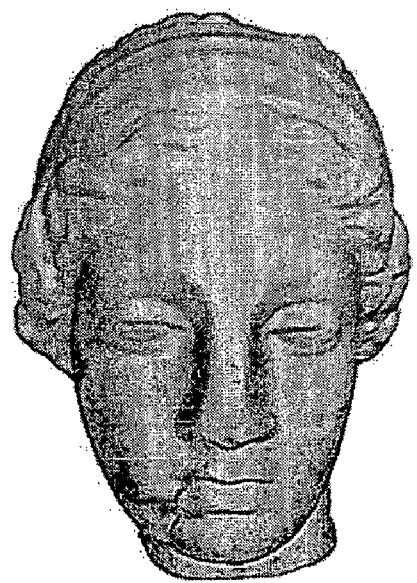
FIGS. 12A-12B illustrate detail editing and smoothing of a face model.
Figure 12B:

FIGS. 12A-12B demonstrate detail editing by individually manipulating vertices on curves as well as local smoothing, which will be discussed in the section on Mesh merging and assembly.

Acceleration for Interactive Deformation

The Poisson equation is a sparse linear system that can be efficiently solved by methods such as the conjugate gradient method. However, according to the running times for FIGS. 8A-8C and FIGS. 9A-9C, when the number of vertices in the mesh becomes too large, it is impossible to achieve interactive rates by solving the Poisson equation at the original resolution. Therefore, it is advantageous to accelerate the mesh editing system using one or more acceleration schemes.

In the linear system defined in Equation 8, matrix A is a matrix that is only dependent on the parameterization mesh and the original target mesh prior to editing. In contrast, b is also dependent on the guidance vector field. Therefore, A is fixed as long the parameterization mesh does not change. In contrast, b changes constantly during interactive mesh editing. Thus, $A^{-1}$ is pre-computed using LU decomposition. Back substitution is only dynamically executed to obtain $A^{-1}$b at every frame. Experiments have indicated that this scheme alone can achieve a three to six-fold increase in computations. It is noted that LU decomposition is less stable that conjugate gradient, and does not preserve the sparse structure of matrix A. Generally, the latter implies that storing the result of LU decomposition requires more memory and reduces the largest mesh size a machine can handle. This acceleration scheme is only used during interactive sessions, and the user can request the system to produce a final version of the deformed mesh using conjugate gradient.

The second acceleration scheme exploits multi-resolution meshes. A multi-resolution mesh pyramid is constructed or built for large meshes using the algorithm presented in "Multiresolution signal processing for meshes," by I. Guskov, W. Sweldens, and P. Schröder, In Proc. SIGGRAPH'99, pp. 325-334, 1999, herein incorporated by reference in its entirety, and mesh editing such as Poisson mesh editing is only performed at the coarsest resolution. At every frame, the pyramid is collapsed to add high frequency details back onto the modified coarsest level to obtain a modified high resolution mesh for display. The pyramid collapse operation can be performed very efficiently. Therefore, this scheme is much more efficient than directly solving the Poisson equation at the highest resolution. Because the tolerance increases with the scale of deformation, multi-resolution acceleration is used for large-scale deformation such as illustrated in FIGS. 10A-10D where the finest bunny model for display has 70K faces and the coarsest model only has 2000 faces.

At the coarsest level for the bunny model, the LU-based acceleration took 29 milliseconds on an Intel Xeon 1.5 GHz processor for each editing operation, while the non-accelerated version took 105 milliseconds. With both acceleration schemes, the present system only took approximately 100 milliseconds at the finest level. In contrast, the non-accelerated version took multiple seconds. The size of the bunny model approaches the limit that can be handled interactively (10 fps) on the machine used.

In the present system, small-scale editing is directly performed on the finest level, but confined to a small surface region. With most of the mesh vertices fixed, editing in a small region can still be performed in real-time as well. The result shown in FIGS. 12A-12B were obtained at the finest level.

Mesh Merging and Assembly

Other aspects of the present invention include merging meshes together to assemble a complete object using Poisson mesh editing described above. Generally, the partial meshes are merged at their open (mesh) boundaries, which serve as Poisson boundary conditions. Merging two meshes involves the following steps:
  i) obtain a mesh boundary on each mesh and the vertex correspondence between them;
  ii) calculate or select the local frames along the two boundaries;
  iii) obtain an intermediate boundary, including both vertex positions and local frames, by either interpolating the original two boundaries using the vertex correspondence or choosing one of the original two boundaries;
  iv) change the mesh connectivity along the boundaries for both meshes according to the intermediate boundary;
  v) compare the local frames at the intermediate boundary with the local frames at the original two boundaries to obtain two sets of quaternions;
  vi) propagate the two sets of quaternions towards the interior of both meshes, respectively;
  vii) set up the linear system in Equation 6 defined above for all the vertices from both meshes and solve it to obtain a merged mesh.

Figure 21:
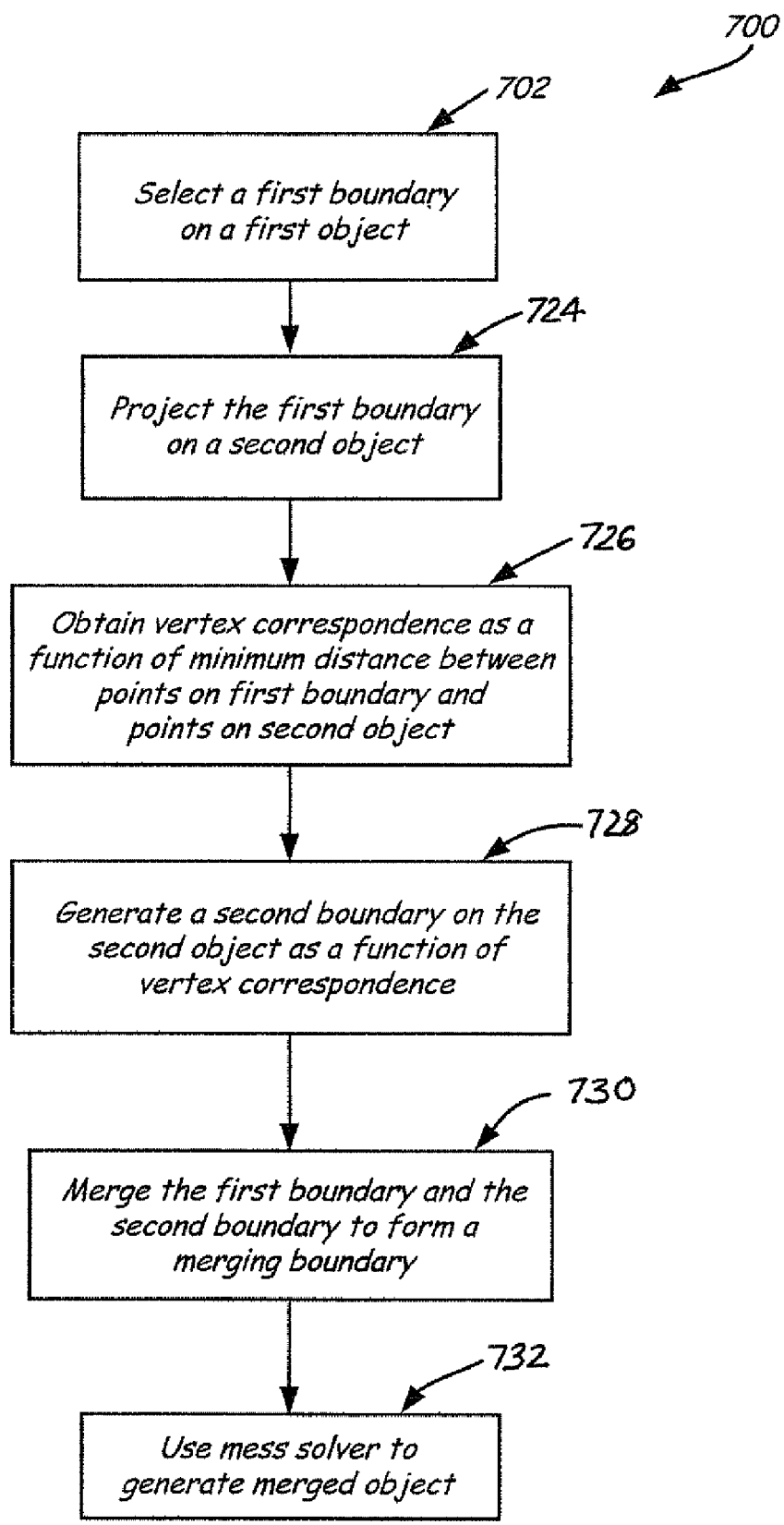
FIGS. 21 illustrates steps of a method of determining a merging curving using projection.
Figure 22:
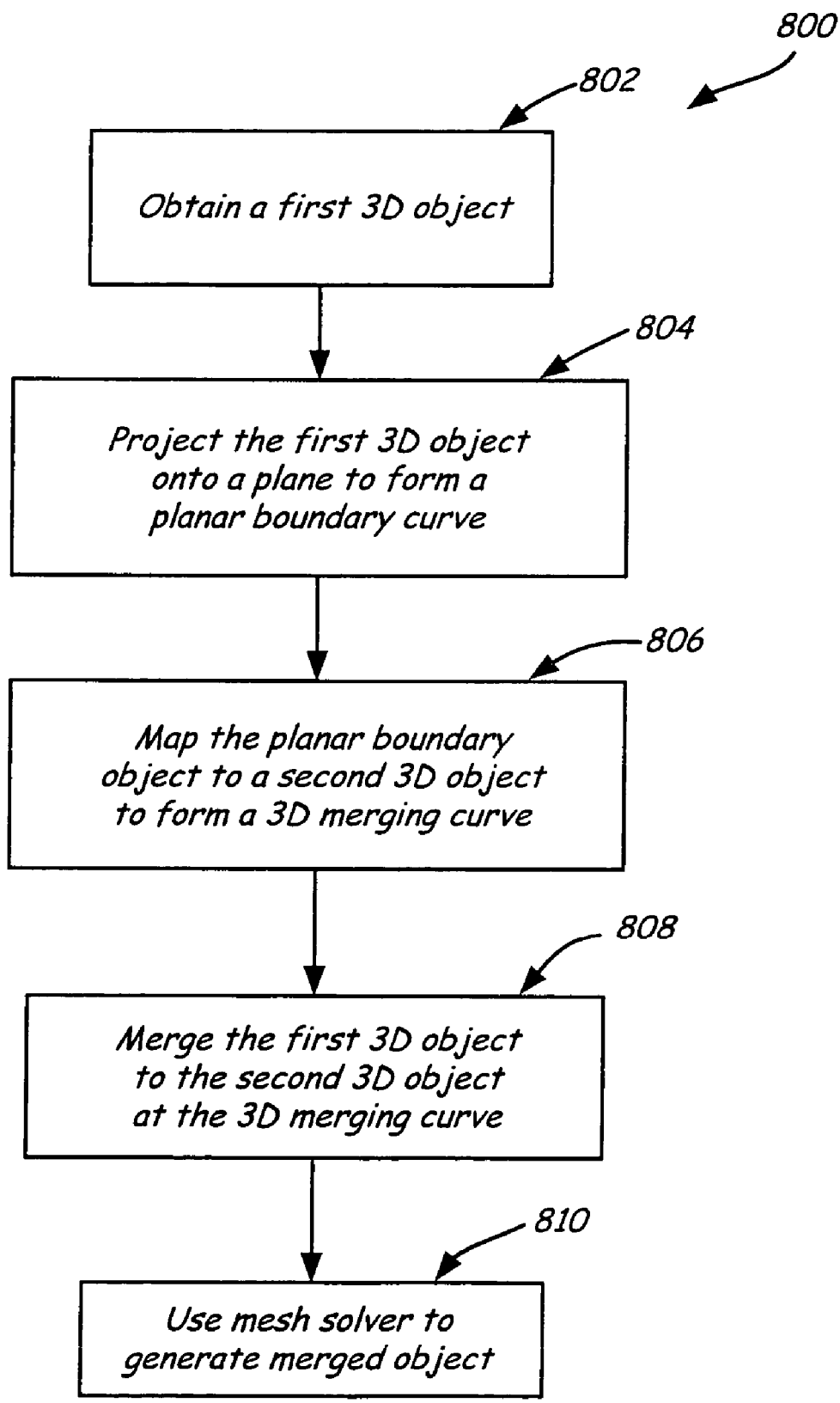
FIG. 22 illustrates steps of a method of determining a merging curve using planar projection and mapping.
Figure 23:
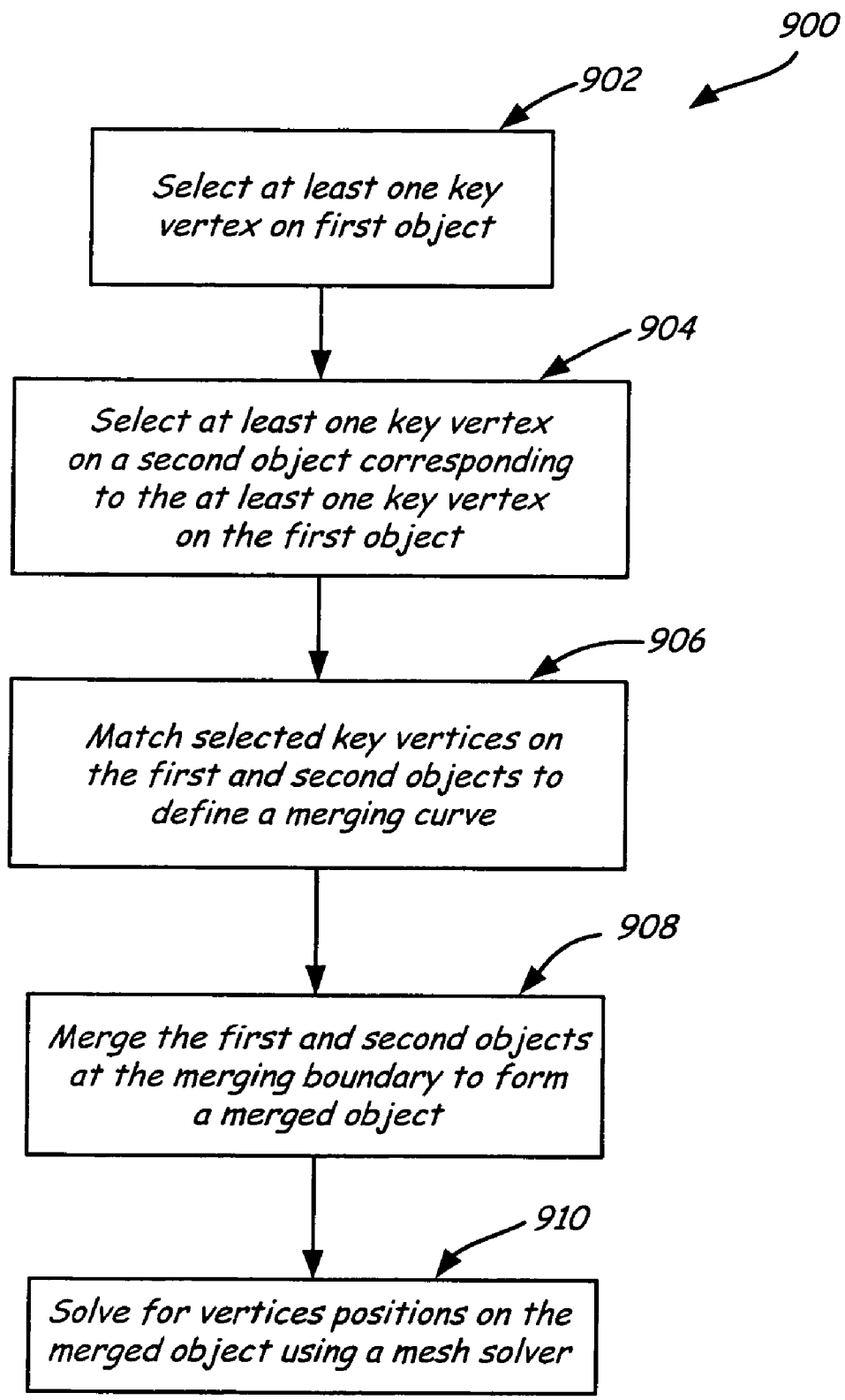
FIG. 23 illustrates steps of a method of determining a merging curve by specifying sparse key vertex correspondence between boundaries.
Figure 24:
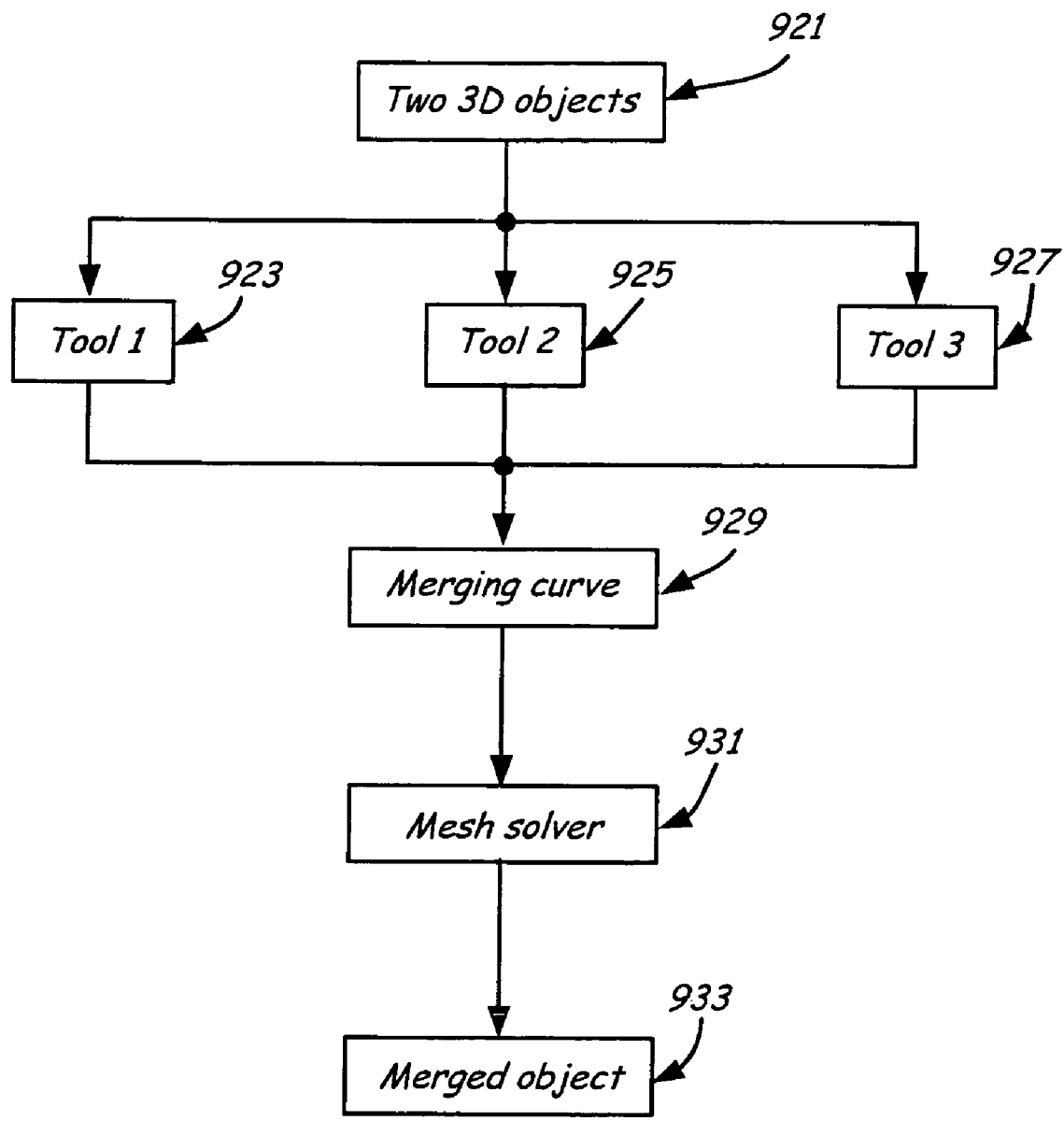
FIG. 24 illustrates a system for using the methods of FIGS. 21-23.

Embodiments of the present invention further include interactive tools for determining vertex correspondence between boundaries of objects to be merged. These boundaries form a merging curve when two objects are merged. These interactive tools are user selectable. The user can select one or more of these tools to perform a merging operation. FIGS. 21-23 illustrate steps of methods 700, 800, 900 for determining merging curves between two objects. FIG. 24 illustrates a system using at least one of the tools in FIGS. 21-23.

Figure 13A:
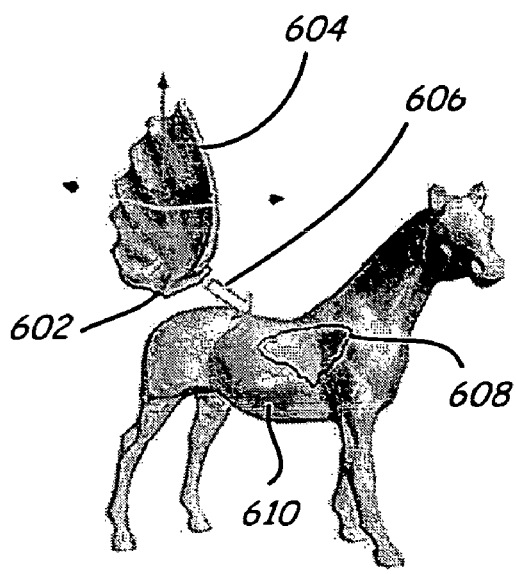
FIGS. 13A-13D illustrate merging of a wing and horse using various methods.
Figure 13B:
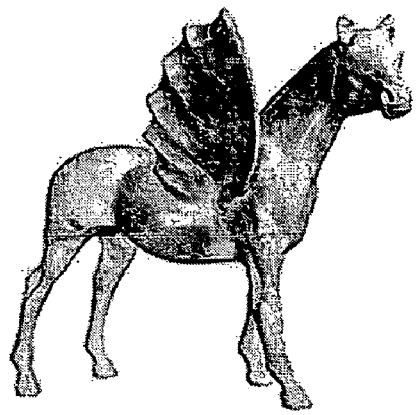

FIGS. 13A-13B illustrate merging of a wing or first mesh (2000 faces) with a horse or second mesh (100K faces) using a first interactive tool for determining vertex correspondence. FIG. 21 illustrates a method associated with FIGS. 13A-13B and are discussed together. At step 722, a first boundary 602 on the wing or first object 604 is selected, as indicated. At step 724, boundary 602 is projected along a user-defined or selected direction indicated at 606 to define a second boundary 608 on the horse or second object 610. The user only needs to interactively define or select a projection direction 606. At step 726, vertex correspondence is obtained or generated by extending every vertex on the first boundary 602 into a ray whose nearest vertex on the second object or mesh 610. At step 728, vertices on second object 610 corresponding to the projected vertices on the first object define a second boundary curve that is generated. At step 730, the first and second objects can then be merged at to form a merging boundary. At step 732, a mesh solver receives merging boundary information such as frame and scale changes of triangles in the first and second objects to generate a merged object or mesh whose vertex positions are solved.

Figure 13C:
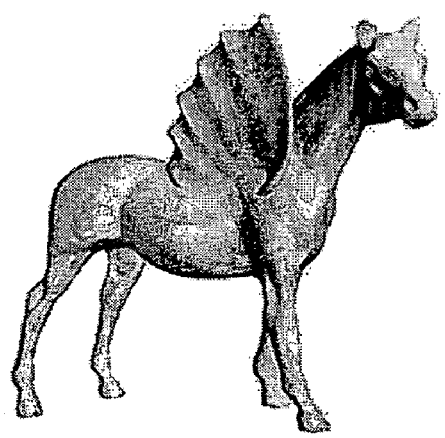
Figure 13D:

FIG. 13B illustrates the wing and horse models merged at a merging boundary formed by the first and second boundaries using the above described tool (running time=400 ms) and a Poisson mesh solver. FIGS. 13C-13D illustrate the wing and horse models merged using a Boolean operation and the WIRE method, respectively.

FIG. 14 is a flow diagram collectively illustrating object merging with projection and mapping and represents another user interactive second tool for determining vertex correspondence. FIG. 22 illustrates a method associated with FIG. 14, in which a dragon or first object (18K faces) and cylinder or second object (60K faces) are being merged (running time 5 seconds). At step 802, dragon 651 (18K faces) is obtained. At step 804, dragon 651 is projected onto plane 655, i.e. planar parameterization of the boundary curve on the first mesh. In the example illustrated herein, the dragon 651 is a three-dimensional or 3D object. In this case, only the front facing half of the dragon 651 is mapped with its open boundary onto plane 655 to form planar boundary curve 653. Planar boundary curve 653 is two dimensional or 2D. At step 806, points on planar boundary curve 653 are then mapped onto second object or cylinder 652 (as in texture-mapping) using a mapping scheme to form second or 3D merging curve 657. At step 808 and step 810, dragon 651 and cylinder 652 can then be merged at merging curve 657 using a mesh solver as indicated at 659.

It important to note that although cylindrical mapping is illustrated, more general parameterizations can be used. For example, dragon mesh 651 can be merged with another 3D object such as a sphere or other object using projection and mapping, and solved using a Poisson or non-Poisson mesh solver.

FIGS. 15A-15C illustrate merging of a teapot 672 (2000 faces) and gargoyle 674 (4000 faces) into another object 676 using a third tool for determining vertex correspondence. FIGS. 16A-16B illustrate another example where two mesh components 681, 683 are merged at their jagged boundaries 685, 687 into another object 686. FIG. 23 is associated with FIGS. 15A-15C and FIGS. 16A-16B. Method 900 illustrated in FIG. 23 is a method for determining a merging curve using sparse key vertex correspondence. At step 902, a user selects at least one key vertex on a first object. At step 904, the user selects at least one key vertex on a second object corresponding to the selected at least one key vertex on the first object. At step 906, the selected key vertices on the first object are matched to the selected key vertices on the second object. Denser correspondence can be determined by interpolation. At step 908, the first and second objects are merged at a defined merging boundary to form a merged object. At step 910, the vertices of the merged mesh or object are solved using a mesh solver. Thus, in both examples, the user interactively defines sparse key vertex correspondences between two boundaries and obtains dense correspondence through interpolation.

The three tools described above require various amounts of user interaction. The tools area vary in their limitations or restrictiveness. For example, the first tool described above and illustrated in FIG. 21 is considered relatively restrictive but requires less user interaction. In contrast, the third tool in FIG. 23 is most powerful and least restrictive but also requires most user interaction. The second tool is intermediate in terms of user interaction needed and tool restrictiveness.

FIG. 24 illustrates a system for determining correspondence between boundary curves on two objects 921 to be merged. The system can comprise one or more of user interactive tools 923, 925, 927 described above with respect to FIGS. 21-23, respectively. User interactive tools 923, 925, 927 generate merging curve 929 which is the curve along which two object 921 will merge. The merging curve 929 is received by mesh solver 931, which can be a Poisson mesh solver as described above or any other mesh solver that can use merging boundary 929 to solve for positions of vertices in merged object 933.

It is further noted that the present system and user interactive tools of determining merging curves or correspondence between boundaries on two objects is not limited to 3D objects but can also be used for 2D or planar objects.

The present mesh editing system described above in performing mesh merging is considered advantageous because the system allows the two mesh boundaries to have very different shapes, sizes and roughness. For example, in FIG. 13A because boundary 602 of the wing is projected along an oblique direction onto the horse surface which has undulations, the two boundaries 602, 610 have different shapes and sizes. The two boundaries 685, 687 in FIG. 16A also have different shapes and are jagged.

Another advantage is the propagation of local frame changes can globally adjust the shapes of the two meshes so they become more compatible with each other. This advantage is demonstrated in FIGS. 13B, 15C, and 16B. Note one of the components in FIG. 15C has genus greater than zero, which would be difficult for parameterization-based merging, such as described in "Dual domain extraction," by B. Levy, ACM Trans. Graphics, (22)(3): 364-369, 2003.

A comparison is given in FIGS. 13B-13D among three approaches. FIG. 13B illustrate the merging result in accordance with the present system. FIG. 13C is the merging result from Boolean intersection. It was necessary to lower the wing order to extract a closed intersection curve between the two partial meshes. As a result, the undulations on the horse model hide a large portion of the wing. FIG. 13D is the result from WIRE such as described in 1998 K. Singh and E. Fiume, 1998. FIG. 9D exhibits the same type of problem as in deformation. After merging, there are noticeable distortions and discontinuities on the wing.

Figure 20A:
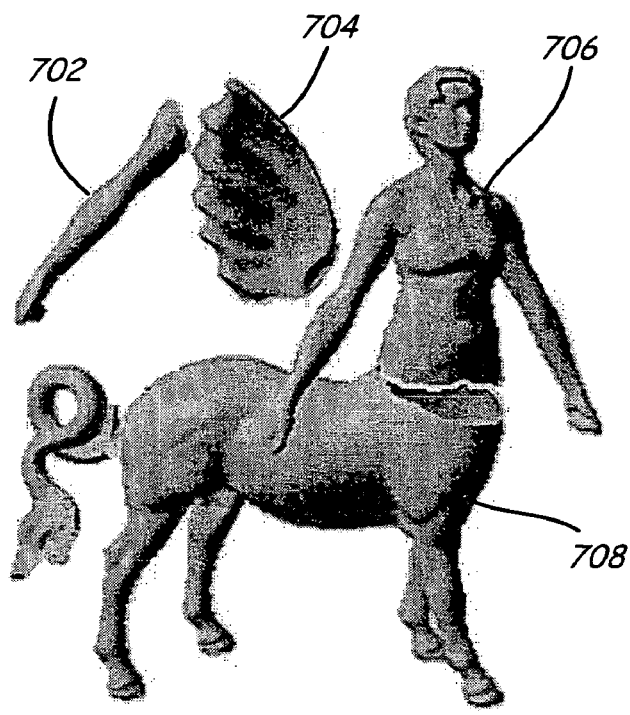
FIGS. 20A-20B illustrates a mythical creature generated using merging and deformation.
Figure 20B:
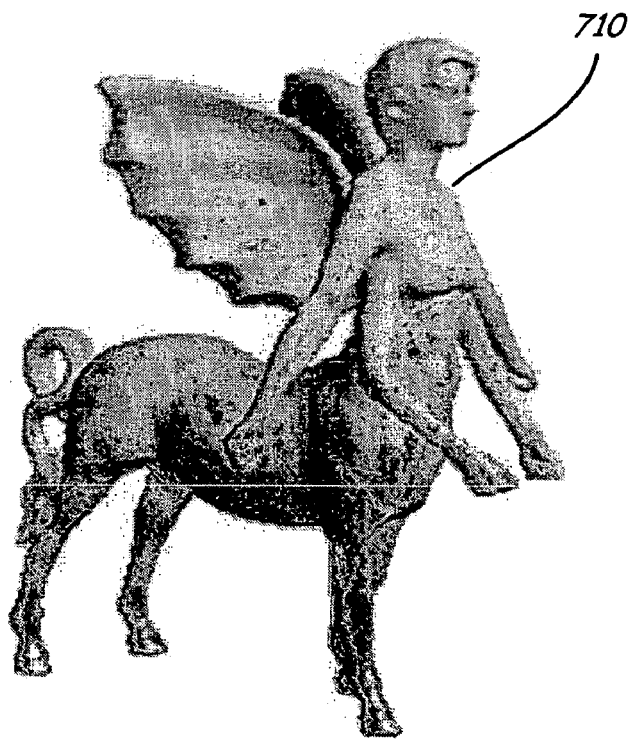

FIGS. 20A-B illustrate an example with both deformation and merging. FIG. 20A illustrates multiple components 702, 704, 706, 708 from typical meshes, which are merged to form mythical creature 710 illustrated in FIG. 20B. Arm 702 is deformed before being merged.

Although Poisson mesh deformation and merging are powerful and flexible, continuity (particularly $G^1$) between constrained and free vertices is not guaranteed. However, continuity at these places can be significantly improved by Poisson normal smoothing, which is introduced below.

Mesh Smoothing and Denoising

The Poisson equation can be applied to perform mesh filtering operations in addition to interactive editing. Other embodiments include a mesh smoothing and/or denoising algorithm. The algorithm does feature-preserving mesh smoothing using normals. In one embodiment, bilateral filtering on the normals is performed instead of the vertex positions to preserve relatively sharp features. Using normals to preserve features on a mesh is more intuitive since normals typically change abruptly at edges and creases. The bilateral filters in the present method have two parameters $\sigma_f$ and $\sigma_g$. $\sigma_f$ controls the spatial weight, while $\sigma_g$ defines the amount of normal variation allowed. Once smoothed normals have been obtained, the present algorithm explicitly shifts vertex positions to reflect the altered normals. Since the normal of a triangle is a nonlinear function of its vertex positions, reconstructing a mesh from predefined normals is a classic nonlinear optimization, which is both relatively expensive and prone to local suboptimal solutions.

The present system of mesh editing facilitates a linear method to obtain vertex positions from normals. Consider one triangle with its original normal $n_i$. Suppose its new normal is defined as $n_i'$. To incorporate this change, a local rotation matrix is defined from the minimal rotation angle and its associated axis that can transform the original normal to the new one. This local rotation matrix serves as the local transform that should be applied to the original triangle to obtain a new triangle and its new gradient vectors. This step is performed over all triangles with altered normals to define new guidance fields as described previously. With these new guidance fields, the new vertex positions of the mesh can be obtained as also described above.

The present smoothing algorithm can be applied to a mesh once, or alternately, with multiple iterations. The solution obtained can be either used directly or as the initialization for further nonlinear optimization. The use of this algorithm includes mesh denoising and mesh smoothing. In the latter case, the bilateral filter is replaced with a regular Gaussian filter for normals because it is not important to preserve small features and artifacts. FIGS. 17A-17B and FIGS. 18A-18B illustrate two examples of feature preserving mesh denoising. FIG. 17A illustrates an original model having a mesh with approximately 150K vertices. FIG. 17B illustrates the model in FIG. 17A after smoothing with one iteration where $\sigma_f=4.0$ and $\sigma_g=0.2\,\pi$.

FIG. 18A illustrates a Noisy model (Gaussian noise). FIG. 18B illustrates the model in FIG. 18A smoothed with three iterations with $\sigma_f=3.0$ and $\sigma_g=0.2\,\pi$. FIGS. 19A-19B illustrate the effect of local smoothing at the merging boundary of the wing and horse in FIGS. 13A-13B. FIGS. 19A-19B illustrate the merging boundary before and after smoothing, respectively, when performed in accordance with the present methods. Finally, FIGS. 12A-12B illustrate smoothing in user specified or selected local regions. FIG. 12A illustrates an original model. FIG. 12B illustrates the model of FIG. 12A edited with local smoothing applied to the cheeks and the groove on the lower left part of the face.

Although the present invention has been described with reference to particular embodiments, workers skilled in the art will recognize that changes may be made in form and detail without departing from the spirit and scope of the invention.

What is claimed is:

1. A computer storage medium including instructions readable by a computer which, when implemented, cause the computer to edit objects modeled as a triangle mesh, wherein each triangle of the triangle mesh has three vertices having associated gradient vectors, the instructions comprising:
   selecting a first plurality of vertices that define a first boundary curve on a triangle mesh, wherein the first plurality of vertices are selected from among a larger set of vertices, each vertex having a corresponding gradient vector;
   modifying the first plurality of vertices to a second plurality of vertices on the mesh, wherein the second plurality of vertices define a second boundary curve on the mesh;
   calculating local frame and scale changes of at least some of the gradient vectors corresponding to at least some of the vertices of the triangle mesh based on the second boundary curve relative to the first boundary curve, wherein the local frame and scale changes are associated with individual triangles of the mesh;
   propagating the local frame and scale changes to generate a disconnected mesh; and
   using a poisson-based mesh solver to calculate coordinates of at least one vertex of a target mesh from the disconnected mesh.

2. The computer storage medium of claim 1, and further comprising:
   identifying coordinates of vertices on the first boundary curve; and
   calculating distances between each vertex of the first plurality of vertices and each corresponding vertex of the second plurality of vertices.

3. The computer storage medium of claim 1, and further comprising determining a vertex on the second boundary curve that is positioned a minimum distance relative to one of the selected vertices on the first boundary curve.

4. The computer storage medium of claim 3, and further comprising merging the first boundary curve to the second boundary curve to form a merged curve.

5. he computer storage medium of claim 4, wherein using a poisson-based mesh solver comprises calculating positions of vertices on the merged curve.

6. The computer storage medium of claim 1, wherein selecting a first plurality of vertices comprises selecting an open or closed curve.

7. The computer storage medium of claim 1, and further comprising identifying a region of influence comprising at least some of the vertices of the first boundary curve to propagate the local frame and scale changes.

8. The computer storage medium of claim 1, wherein propagating local frame and scale changes comprises calculating distances between the second boundary curve and the first boundary curve.

9. The computer storage medium of claim 1, wherein each of the vertices of the mesh comprises three gradient vectors.

10. A method of editing a triangle mesh, each triangle of the mesh having three vertices with corresponding gradient vectors, the method comprising performing, via a computer:
    selecting a first plurality of vertices on the mesh from among a larger set of vertices forming the mesh;
    modifying at least some of the first plurality of vertices to generate a corresponding second plurality of vertices, wherein there is a one-to-one correspondence between the first plurality of vertices and the second plurality of vertices;
    calculating local frame and scale changes of at least some of the gradient vectors corresponding to vertices of the mesh based on distances between the at least some of the first plurality of vertices and the corresponding second plurality of vertices, wherein the local frame and scale changes are associated with individual triangles of the mesh;
    propagating the local frame and scale changes to generate a disconnected mesh;
    generating a target mesh from the disconnected mesh using a poisson-based mesh solver; and
    visually displaying the target mesh on a user interface.

11. A method of determining correspondence between boundaries on two triangle meshes to be merged into a target mesh, the method comprising performing, via a computer:
    selecting a first boundary comprising interconnected vertices on a first triangle mesh;
    identifying vertices on the second triangle mesh, wherein the identified vertices form a second boundary;
    calculating distances between the first boundary and the second boundary;
    calculating local frame and scale changes to at least some of the vertices of the first mesh and the second mesh based on the calculated distances, wherein the local frame and scale changes are associated with individual triangles on the first and second meshes;
    propagating the local frame and scale changes to generate a disconnected mesh;
    solving for coordinates of vertices of the target mesh using a poisson-based mesh solver; and
    visually displaying the target mesh on a user interface.

12. The method of claim 11, wherein calculating distances between the first boundary and the second boundary comprises identifying vertices on the second boundary that are a minimum distance from a corresponding vertex on the first boundary.

13. The method of claim 11, and further comprising selecting a merged curve on which the first boundary and the second boundary are to be merged.

14. The method of claim 11, and further comprising receiving a direction to merge the first boundary to the second boundary.

15. A mesh editing system having a computer that includes the computer storage medium of claim 1 and is configured to process the instructions.

* * * * *